(12) United States Patent
Pupat et al.

(10) Patent No.: US 10,760,015 B2
(45) Date of Patent: Sep. 1, 2020

(54) INSTALLATION AND INTEGRATED HYDROTREATMENT AND HYDROCONVERSION PROCESS WITH COMMON FRACTIONATION SECTION

(71) Applicant: AXENS, Rueil-Malmaison (FR)

(72) Inventors: Nicolas Pupat, Houilles (FR); Odile Lajeunesse, Rueil-Malmaison (FR); Jerome Bonnardot, Le Chesnay (FR); Christelle Pourcelly, Houilles (FR); Benoit Despres, Saint Germain En Laye (FR)

(73) Assignee: AXENS, Rueil Malmaison (FR)

( * ) Notice: Subject to any disclaimer, the term of this patent is extended or adjusted under 35 U.S.C. 154(b) by 138 days.

(21) Appl. No.: 15/849,053

(22) Filed: Dec. 20, 2017

(65) Prior Publication Data

US 2018/0171246 A1   Jun. 21, 2018

(30) Foreign Application Priority Data

Dec. 20, 2016 (FR) ..................... 16 62929

(51) Int. Cl.
*C10G 67/14* (2006.01)
*C10G 7/00* (2006.01)
(Continued)

(52) U.S. Cl.
CPC ............. *C10G 67/14* (2013.01); *B01D 3/143* (2013.01); *C10G 7/00* (2013.01); *C10G 45/02* (2013.01);
(Continued)

(58) Field of Classification Search
CPC ........ C10G 67/14; C10G 65/14; C10G 47/00; C10G 7/00; C10G 45/02;
(Continued)

(56) References Cited

U.S. PATENT DOCUMENTS

| 6,072,091 | A | 6/2000 | Cosyns |
| 2002/0125172 | A1* | 9/2002 | Que ................. C10G 47/26 208/108 |

(Continued)

FOREIGN PATENT DOCUMENTS

WO     2012134838 A1    10/2012

OTHER PUBLICATIONS

Search report in corresponding French application 1662929 dated Aug. 29, 2017.

*Primary Examiner* — Prem C Singh
*Assistant Examiner* — Juan C Valencia
(74) *Attorney, Agent, or Firm* — Millen, White, Zelano and Branigan, P.C.

(57) ABSTRACT

An installation for the hydrotreatment and hydroconversion of hydrocarbon-containing feedstocks, with a common fractionation section, for the production of at least one of the following products: naphtha (light and/or heavy), diesel, kerosene, distillate and residue:

comprising at least:
 at least one hydroconversion reactor,
  a hot high-pressure separator drum B-1, a cold high-pressure separator drum B-2,
 at least one hydrotreatment reactor,
  a cold high-pressure separator drum B-20,
 a common fractionation section separating a top fraction, an intermediate fraction and a heavy fraction, An integrated hydroconversion and hydrotreatment process implementing said installation.

8 Claims, 4 Drawing Sheets

(51) Int. Cl.
*C10G 45/02* (2006.01)
*B01D 3/14* (2006.01)
*C10G 65/14* (2006.01)
*C10G 47/00* (2006.01)

(52) U.S. Cl.
CPC ............. *C10G 47/00* (2013.01); *C10G 65/14* (2013.01); *C10G 2300/1022* (2013.01); *C10G 2300/1037* (2013.01); *C10G 2300/1074* (2013.01); *C10G 2400/02* (2013.01); *C10G 2400/04* (2013.01); *C10G 2400/08* (2013.01)

(58) Field of Classification Search
CPC ........ C10G 2300/1022; C10G 2400/04; C10G 2400/08; C10G 2300/1074; C10G 2300/1037; C10G 2400/02; C10G 67/02; C10G 2300/1077; B01D 3/143
See application file for complete search history.

(56) References Cited

U.S. PATENT DOCUMENTS

| | | | | |
|---|---|---|---|---|
| 2005/0103683 | A1* | 5/2005 | Farshid | C10G 65/12 |
| | | | | 208/108 |
| 2009/0159493 | A1* | 6/2009 | Bhattacharya | C10G 45/02 |
| | | | | 208/58 |
| 2013/0056394 | A1 | 3/2013 | Ancheyta Juarez | |
| 2014/0158585 | A1 | 6/2014 | Van Doesburg | |

* cited by examiner

INSTALLATION AND INTEGRATED HYDROTREATMENT AND HYDROCONVERSION PROCESS WITH COMMON FRACTIONATION SECTION

FIELD OF THE INVENTION

The invention relates to the field of the refining processes that comprise a reaction section producing $H_2S$ and/or light compounds, a section for the separation of the effluent composed of at least one separator drum following by a fractionation section.

The process according to the invention consists of fractionating the effluents from at least two units carrying out different processes in a common section without mixing them beforehand, and supplying the flows produced in the separator drums to different places in the fractionation column or columns.

According to the invention, the common fractionation is constituted by a main fractionation column and optionally at least one column for separation of the light fractions, called a stripping column or stripper.

PRIOR ART

U.S. Pat. No. 5,403,469 describes a process in which a hydrotreatment unit and a hydrocracking unit are operated in parallel. The effluent from each of the reaction sections is collected in a common separator, the liquid fraction of which is sent into a single fractionation zone. In this process, all the effluents from the reaction section are thus mixed before being separated again in the fractionation section. Furthermore, in this process, as the separator drum is common to both units, the operating pressure of their reaction sections is linked.

U.S. Pat. No. 5,447,621 describes a process in which hydrocracking is carried out, the hydrocracked effluent is distilled in an acid fractionation column, followed by hydrotreatment of the diesel fraction originating from the fractionation: all of the hydrotreated fraction is sent to the diesel side-stripper of the main fractionation section. Thus the two units, which are dependent on each other, require only a single fractionation section. In this process, all of the effluent from the diesel hydrotreatment is supplied to the side-stripper of the fractionation column of the hydrocracker. This patent does not describe a process in which the supply to the common fractionation section is carried out separately for the different flows originating from the separator drums situated downstream of the reaction sections of these two units and upstream of the fractionation, nor a process with a separation column treating the light fractions upstream of the main fractionation column.

Patent application EP2710094 A4 describes a process in which two hydrocarbon-containing feedstocks are treated in a hydroprocessing unit and a hydrotreatment unit. A part of the effluent from the hydrotreatment unit is mixed with the effluent from the hydroprocessing unit. Then at least a part of the mixture is sent to a common fractionation zone. This application does not describe a process in which the supply of the common fractionation section is carried out separately for the different flows originating from the separator drums situated downstream of the reaction sections of these two units and upstream of the fractionation.

U.S. Pat. No. 8,608,940 B2, U.S. Pat. No. 8,747,653 B2, EP 1,319,701 B2, U.S. Pat. No. 9,005,430 B2 and patent application US 2008/0093262 describe processes in which two independent or dependent hydroprocessing units are operated with their compression section being shared. This section is the easiest to share since it is a matter of hydrogen supplying two different units. These patents do not describe a process in which the fractionation section of two hydroprocessing units is shared and in which the supply of the fractionation section is carried out separately for the different flows originating from the separator drums situated downstream of the reaction sections of these two units and upstream of the fractionation.

Application FR 15/63.173 filed by the Applicant on 23 Dec. 2015, unpublished, describes a refining process which uses a reaction section producing $H_2S$ and/or light compounds, a separation section composed of at least one separator drum, at least one stripping column of the light fractions originating from the separator drums and a fractionation column of the main products treating the fraction from the bottom of the stripping column and the heavy fractions originating from the separator drums, each of the flows being supplied to different places in the fractionation columns.

None of the documents of the prior art propose a solution for completely integrating the fractionation between two different units in order to obtain products of optimized quality in a flexible manner.

According to the invention, not only is the fractionation of the two units common, and investment minimized, but the energy efficiency of the process is maximized by separately supplying each of the flows produced by the different separator drums of each separation section of each unit to the optimum places in the fractionation section.

Moreover, according to the invention, it becomes possible to vary the cut points of the finished products of the second unit, while said unit usually comprises no main fractionation column.

DESCRIPTION OF THE INVENTION

Summary of the Invention

The invention relates to an installation for the hydrotreatment and hydroconversion of hydrocarbon-containing feedstocks, with a common fractionation section, for the production of at least one of the following products: naphtha (light and/or heavy), diesel, kerosene, distillate and residue, comprising: at least:
a reaction section R-1 comprising at least one hydroconversion reactor,
a hot high-pressure separator drum B-1, supplied with the effluent originating from the reaction section R-1, and the liquid effluent of which is a heavy fraction of the effluent from the reaction section R-1.
a cold high-pressure separator drum B-2, supplied with the gaseous flow originating from the hot high-pressure separator drum B-1, and the liquid effluent of which is a light fraction of the effluent from the reactor R-1.
optionally a hot medium-pressure separator drum B-3, supplied with the liquid effluent originating from the hot high-pressure separator drum B-1, and the liquid effluent of which supplies the drum B-5;
optionally a cold medium-pressure separator drum B-4, supplied with the liquid effluent originating from the cold high-pressure separator drum B-2, and the gaseous fraction originating from the hot medium-pressure separator drum B-3 and the liquid effluent of which constitutes a feedstock of the common fractionation section;

optionally a hot low-pressure separator drum B-5, supplied with the liquid flow originating from the hot medium-pressure separator drum B-3, and the liquid effluent of which constitutes a feedstock of the common fractionation section;

a reaction section R10 comprising at least one hydrotreatment reactor,
optionally, a hot high-pressure separator drum B-10, supplied with the effluent originating from the reaction section R-10, and the liquid effluent of which is a heavy fraction of the effluent from the reaction section R-10;
a cold high-pressure separator drum B-20, supplied with any gaseous flow originating from the hot high-pressure separator drum B-10, or directly with the effluent originating from the reaction section R-10, and the liquid effluent of which constitutes the light fraction or a mixture of the light fraction and the heavy fraction of the effluent from the reaction section R-10 which supplies either a cold medium- or low-pressure separator drum or, directly, the common fractionation section.
optionally a hot medium-pressure separator drum B-30, the feedstock of which is the liquid flow originating from the hot high-pressure separator drum B-10, if it exists,
optionally a cold medium-pressure separator drum B-40, supplied with the liquid flow originating from the cold high-pressure separator drum B-20, and the gaseous flow originating from the hot medium-pressure separator drum B-30, if it exists, and the liquid effluent of which constitutes a feedstock of the common fractionation section;
optionally a hot low-pressure separator drum B-50, supplied with the liquid flow originating from the hot medium-pressure separator drum B-30, and the liquid effluent and the vapour effluent of which constitute one or more feedstocks of the common fractionation section a common fractionation section comprising at least one main fractionation column C-2, making it possible to separate a top fraction, an intermediate fraction and a heavy fraction, said fractions comprising the different products of the units, the supply of the flow or flows originating from the first unit and the supply of the flow or flows originating from the second unit to said common fractionation unit being separate.

In an embodiment, the common fractionation section comprises a separation column C-1, said separation column C-1 being separately supplied with:
on the one hand, the liquid flow originating from the cold high-pressure separator drum B-2, and optionally the gaseous flow originating from the hot low-pressure separator drum B-5 of the first unit;
on the other hand the liquid flow from the cold high-pressure separator drum B-20, and/or the liquid flow from the cold medium-pressure separator drum B-40, and/or the gaseous flow originating from the cold low-pressure separator drum B-50, of the second unit;
the main fractionation column C-2 being supplied with the liquid effluent from said separation column C-1, separately with the liquid flow originating from the hot low-pressure separator drum B-5 of the first unit, and with the liquid flow originating from the hot medium-pressure separator drum B-30 of the second unit.

The common fractionation section can also comprise:
at least one side-stripping column C-4, C-5 or C-6, supplied with one of the products of the intermediate fraction originating from the main fractionation column C-2: kerosene, diesel or residue, making it possible to separate a top gaseous fraction and a bottom liquid fraction,
a pipe making it possible to send said top gaseous fraction to the main fractionation column C-2;
an exchanger E4 for cooling said bottom liquid fraction of said side-stripping column;
an outlet pipe for said cooled liquid fraction.

The installation can comprise a section for the treatment of acid gases C-7 comprising an amine absorber or a washing column operating at very low pressure, supplied with at least a part of the top fraction originating from the main fractionation column C-2 containing the residual acid gases.

The installation can comprise a section for the recovery of liquefied petroleum gases comprising one or more fractionation columns, supplied with at least a part of the top fraction originating from the main fractionation column C-2 containing the residual acid gases, or with the flow originating from the section for the treatment of the acid gases C7.

In a variant of the installation according to the invention, one or other of the reaction sections comprises a hydroisomerization section including a catalytic dewaxing unit, comprising at least one catalyst bed with a catalyst comprising a zeolite, a hydrogenating/dehydrogenating function, and an acid function.

In an embodiment, the first unit is a hydrocracking unit and the second unit a diesel hydrodesulphurization unit.

In another embodiment, the first unit is a unit for the hydroconversion of residue or distillate or deasphalted oil in an ebullating bed, and the second unit is a unit for the hydrodesulphurization of vacuum distillate, or of diesel or kerosene.

Preferably, the first unit is a unit for the hydroconversion of deasphalted oil in an ebullating bed, and the second unit is a unit for the hydrodesulphurization of vacuum distillate.

The invention also relates to an integrated process for the hydrotreatment and hydroconversion of gasoils, vacuum distillates, atmospheric or vacuum residues, using the installation described previously, in which the separation column C-1 operates under the following conditions: total pressure comprised between 0.4 MPa and 2.0 MPa, preferably between 0.6 and 2.0 MPa, very preferably between 0.7 and 1.8 MPa.

The fractionation column C-2 advantageously operates under the following pressure conditions: total pressure comprised between 0.1 MPa and 0.4 MPa, preferably comprised between 0.1 and 0.3 MPa.

The side-stripping column(s) C-4, C-5 and C-6 advantageously operate under the following pressure conditions: total pressure comprised between 0.1 MPa and 0.4 MPa, preferably comprised between 0.1 and 0.3 MPa.

The operating conditions of the catalytic hydrotreatment, hydroconversion and hydroisomerization reactions are advantageously: a temperature of the fixed-bed reaction sections comprised between 200 and 460° C., an average temperature of the catalytic bed of the ebullating-bed reaction sections comprised between 300 and 600° C., preferably between 350° C. and 510° C., a total pressure comprised between 1.5 and 35 MPa, preferably between 2 and 25 MPa, an overall hourly space velocity of liquid feedstock for each catalytic step comprised between 0.1 et 20, preferably comprised between 0.15 and 15, a quantity of hydrogen relative to the liquid feedstock comprised between 50 and 2500 $Nm^3/m^3$.

Advantageously, the hydrocarbon-containing feedstock is selected from feedstocks of the atmospheric distillate type (naphtha, gasoline, kerosene and gasoils), vacuum distillate, for example gasoils, originating from the direct distillation of crude or from conversion units such as FCC, coker or visbreaking, such as LCO (light cycle oil) light gasoil originating from a catalytic cracking unit, the feedstocks originating from aromatic extraction units, lubricating oil bases or bases originating from solvent dewaxing of lubricating oil bases, the distillates originating from fixed-bed or ebullating-bed desulphurization or hydroconversion processes of ATR (atmospheric residues) and/or of VR (vacuum residues) and/or deasphalted oils, the deasphalted oils, effluents from a Fischer-Tropsch unit, the vegetable oils, alone or in a mixture, or animal fats.

Preferably, the hydrocarbon-containing feedstock is selected from the gasoils, vacuum distillates, atmospheric or vacuum residues or effluents from a Fischer-Tropsch unit.

General Points:

By hydrocracking or hydroconversion, is meant a cracking process under hydrogen, making it generally possible, in the refining of crude oils, to convert a vacuum distillate into lighter products.

By hydrotreatment or hydroprocessing, is meant all of the purification processes that make it possible to remove the various impurities contained in the hydrocarbon-containing cuts, by the action of hydrogen.

The hydrotreatment processes are used in refining to purify hydrocarbon-containing mixtures in order to make from them products that can be easily upgraded. They are usually mainly used for the hydrodesulphurization, dearomatization, hydrodenitrogenation etc. of feedstocks such as heavy petroleum or synthetic cuts, for example kerosenes, gasoils or distillates originating from atmospheric and vacuum distillation in order to produce kerosene, gasoil or vacuum distillate that can be upgraded, either in the storage unit receiving products of the same type ("pool"), or to a downstream unit such as the catalytic cracking unit. During the hydrotreatment, small quantities of fuel gas and light cuts such as LPGs and naphtha are also produced.

According to the invention, the fractionation sections of a hydroconversion unit and a hydodesulphurization unit can advantageously be shared. For example, a hydrocracking unit (technology marketed in particular under the name Hyk™) and a diesel hydodesulphurization unit (technology marketed in particular under the name Prime-D™). The hydroconversion process can also be a hydroconversion of residue or of distillate in an ebullating bed; this technology is in particular marketed under the name H-OIL® and the hydodesulphurization process can involve, for example, a unit for the hydodesulphurization of vacuum distillate or diesel or kerosene.

The list of processes to which the invention relates is not exhaustive; the invention generally relates to the refining processes that comprise a reaction section producing $H_2S$ and/or light compounds, a section for the separation of the effluent, composed of at least one separator drum followed by a fractionation section.

The light compounds to which reference is made are compounds that are gaseous at atmospheric pressure and ambient temperature, characterized by boiling points typically ranging up to approximately 20° C. such as for example, hydrogen, methane, ethane, propane, butane or carbon monoxide or dioxide. This list is not exhaustive.

DETAILED DESCRIPTION OF THE INVENTION

The invention relates to the field of refining processes that comprise a reaction section producing $H_2S$ and/or light compounds, a section for the separation of the effluent composed of at least one separator drum followed by a fractionation section. The process according to the invention consists of fractionating the effluents from at least two units carrying out different processes in a common section without mixing them beforehand, and supplying the flows produced in the separator drums to different places in the fractionation column. According to the invention, the common fractionation is constituted by a main fractionation column and optionally at least one column for stripping the light fractions, called a separation column.

The installation according to the invention advantageously makes it possible to implement hydroconversion, hydrotreatment, hydrocracking or hydroisomerization processes treating gasoils, kerosenes, vacuum distillates, atmospheric or vacuum residues, deasphalted oils, vegetable oils or effluents from a Fischer-Tropsch unit. The invention can relate to units operating with fixed-bed or ebullating-bed reactors. This list of processes is not exhaustive.

In fact, these processes comprise a reaction section producing $H_2S$ and/or light compounds, a separation section composed of at least one separator drum optionally followed by a fractionation section. Said fractionation section mainly achieves the following objectives:

elimination of $H_2S$ and/or light compounds if necessary, the main fractionation of the products of the unit and optionally the stabilization of the lighter cuts.

The process according to the invention consists of:

treating, in a single fractionation section, the effluents of at least two units carrying out different processes and producing at least one product with equivalent properties;

utilizing, in this fractionation section:

at least one main fractionation column, optionally at least one separation column, treating the light fractions in order to eliminate the $H_2S$ and/or the light compounds, called stripper or stabilization column, when the unit does not produce $H_2S$.

When the separation column is present, the main fractionation column treats the liquid effluent from said separation column and the heavy fractions originating from each of the units.

The installation according to the invention comprises:

At least one first unit comprising a reaction section producing $H_2S$ and/or light compounds, a section for separation of the effluent composed of at least one separator drum followed by a fractionation section common with at least one other unit. Said common fractionation section comprises a main atmospheric fractionation column for the products of the unit and optionally a column for the separation of the light fractions.

Typically, this unit can be a hydrocracking unit for gasoils, vacuum distillates, atmospheric or vacuum residues or effluent from a Fischer-Tropsch unit. This list is not exhaustive.

The first unit according to the invention typically comprises:

a reaction section comprising at least one reactor R-1, a hot high-pressure separator drum B-1, the feedstock of which is the effluent originating from R-1, and the liquid effluent of which is a heavy fraction of the effluent from the reactor R-1.

a cold high-pressure separator drum B-2, the feedstock of which is the gaseous flow originating from B-1, and the liquid effluent of which constitutes a light fraction of the effluent from the reactor R-1.

optionally, a zone K for the compression of the gaseous effluent originating from B-2, called recycled hydrogen, optionally a hot medium-pressure separator drum B-3, the feedstock of which is the liquid effluent originating from B-1, optionally a cold medium-pressure separator drum B-4, the feedstock of which is the liquid effluent originating from B-2 and the gaseous flow originating from B-3, and the liquid effluent of which constitutes a feedstock of the stripper C-1 in an embodiment of the invention or one of the feedstocks of the fractionation column C-2 in another embodiment, without the stripper C-1 optionally a hot low-pressure separator drum B-5, the feedstock of which is the liquid effluent originating from B-3 and the liquid effluent of which constitutes a feedstock of the fractionation column C-2 and the vapour effluent of which can be a feedstock of the separation column (stripper) C-1 in an embodiment of the invention or one of the feedstocks of the fractionation column C-2 in another embodiment, without the stripper C-1.

optionally, a furnace F-1 heating the feedstock of the reaction section R1 or according to certain variants only the hydrogen necessary for said reaction section, or also the hydrogen and the feedstock.

optionally, a compressor K-2 supplying the reaction section R1 with the hydrogen necessary for said reaction section.

Depending on the nitrogen and sulphur content of the feedstock, the separation section generally also comprises one or more injections of washing water, for example upstream of the cold high-pressure separator drum or between the hot medium-pressure separator drum and the cold medium-pressure separator drum.

A fractionation section shared with at least one second unit, as described below.

At least one second unit, of a different refining process, comprising a reaction section producing $H_2S$ and/or light compounds, a section for the separation of the effluent composed of at least one separator drum followed by a fractionation section common with the first unit. According to the invention, the process implemented in the second unit does not, when implemented in the usual manner by a person skilled in the art, require a main fractionation column of the products of the unit.

Typically, this unit can be a hydrotreatment unit for cuts such as kerosene, diesel or distillates originating from the direct distillation of petroleum or other refining units.

More generally, this unit can be a unit of any process comprising a reaction section producing $H_2S$ and/or light compounds, followed by a section for separation of the effluent, composed of at least one separator drum optionally followed by a fractionation section.

The second unit according to the invention typically comprises:

a reaction section comprising at least one reactor R-10,

Optionally, a hot high-pressure separator drum B-10, the feedstock of which is the effluent originating from R-10, and the liquid effluent of which constitutes the heavy fraction of the effluent from the reactor.

a cold high-pressure separator drum B-20, the feedstock of which is the gaseous flow originating from B-10, if it exists, and the liquid effluent of which constitutes the light fraction of the effluent from the reactor. If B-10 does not exist, the feedstock is the effluent originating from R-10 and the liquid effluent from B-20 is a mixture of the light fraction and the heavy fraction of the effluent from the reactor R-10 which supplies either a cold medium- or low-pressure separator drum or, directly, the separation column C-1 in an embodiment of the invention or the fractionation column C-2 in another embodiment, without the column C-1.

a zone K' for the compression of the gaseous effluent originating from B-20 called recycled hydrogen, optionally a hot medium-pressure separator drum B-30, the feedstock of which is the liquid flow originating from B-10, if it exists, optionally a cold medium-pressure separator drum B-40 the feedstocks of which are the liquid flow originating from B-20 and the gaseous flow originating from B-30, if it exists, and the liquid effluent of which constitutes a feedstock of the separation column C-1 (stripper) in an embodiment of the invention or one of the feedstocks of the fractionation column C-2 in another embodiment, without the stripper C-1.

optionally a hot low-pressure separator drum B-50, the feedstock of which is the liquid flow originating from B-30 and the liquid effluent of which is a feedstock of the main atmospheric fractionation column C-2 and the vapour effluent of which is a feedstock of the separation column (stripper) C-1 in an embodiment of the invention or one of the feedstocks of the fractionation column C-2 in another embodiment, without the stripper C-1.

Optionally, a furnace F-10 heating the feedstock of the reaction section R-10 or according to certain variants only the hydrogen necessary for said reaction section, or also the hydrogen and the feedstock.

Optionally, a compressor K-20 supplying the reaction section R-10 with the hydrogen necessary for said reaction section.

Depending on the nitrogen and sulphur content of the feedstock, the separation section generally comprises one or more injections of washing water, for example upstream of the cold high-pressure separator drum or between the hot medium-pressure separator drum and the cold medium-pressure separator drum.

A fractionation section common with the first unit described previously, comprising at least one main fractionation column and optionally a separation column C-1 (stripper or stabilization column).

In a first embodiment, the common fractionation column according to the invention comprises:

At least one separation column C-1 allowing the removal of the $H_2S$ and/or the light compounds also called stripper or stabilization column. Said stripper C-1 is supplied, on the one hand, with the light flow or flows originating from the first unit: for example with the liquid from the cold high-pressure separator drum B-2, and/or the cold medium-pressure separator drum B-4, and optionally the gaseous flow originating from the hot low-pressure separator drum B-5. These flows originating from the reaction effluent of the first unit are supplied separately from each other or in a mixture. Generally the supplies are placed with respect to each other in such a way that the cuts are increasingly heavy from the top to the bottom of the column.

The separation column C-1 is supplied, on the other hand, with the light flow or flows originating from the separator drums operating at low temperature of the second unit: for example either directly with the liquid from the cold high-pressure separator drum B-20, or with the liquid from the cold medium-pressure separator drum B-40, if this exists, and optionally with the gaseous flow originating from the cold low-pressure separator drum B-50, if this exists. According to the invention, the flows originating from the reaction effluent of the second unit are supplied to the common fractionation unit separately or in a mixture, but are not mixed with the flows originating from the first unit. Typically, the supplies are placed with respect to each other in such a way that the cuts are increasingly heavy from the top to the bottom of the column.

At least one main atmospheric fractionation column C-2, supplied with the product from the bottom of the separation column C-1 and with the heavy fractions originating from the separator drums or each of the units.

The main fractionation column C-2 separates the different products of the units, typically, at least one of the following products: naphtha (light and/or heavy), diesel, kerosene, distillate and residue.

The main fractionation column C-2 is supplied on the one hand with the heavy flow or flows originating from the first unit: for example with the liquid flow originating from the hot high-pressure separator drum B-1, and/or from the hot medium-pressure separator drum B-3, and/or from the hot low-pressure separator drum B-5. This column is generally supplied with a stripping fluid at the bottom of the column, generally steam.

The main fractionation column C-2 is supplied, on the other hand, and separately from the flows originating from the first unit, with the heavy flow or flows originating from the second unit, i.e. the liquid flows originating from the hot drums if said drums exist: for example with the liquid flow originating from the hot high-pressure separator drum B-10, and/or from the hot medium-pressure separator drum B-30, and/or from the hot low-pressure separator drum B-50.

The flows originating from the separation of the reaction effluent from the second unit are supplied separately or in a mixture, but are not mixed with the flows originating from the first unit. Preferably, the supplies are placed with respect to each other in such a way that the cuts are increasingly heavy from the top to the bottom of the column.

At least one side-stripping column C-4 (side-stripper) which treats one of the products originating from the main fractionation column C-2: diesel, kerosene or residue. This stripper can be supplied with stripping fluid or reboiled using a furnace or an exchanger, the hot fluid of which can be a hot utility or a hot process flow internal or external to the unit. The vapour from the top of this column returns to the main fractionation column C-2. The bottom of the column generally constitutes one of the finished products of the unit.

Optionally, a furnace F-2 makes it possible to heat the feedstock or feedstocks supplying the fractionation column C-2.

Optionally, at least a part of the liquid flows originating either from the hot high-pressure separator drum B-10, or from the hot medium-pressure separator drum B-30, or from the hot low-pressure separator drum B-50 of the second unit directly supplies a side-stripping column of the main fractionation section.

Optionally, at least a part of the liquid flows originating from the cold high-pressure separator drum B-20, or from the cold medium-pressure separator drum B-40 directly supplies a side-stripping column of the main fractionation section.

In a second embodiment, the common fractionation section does not comprise separation column C1 treating the light fractions, but comprises a main atmospheric fractionation column treating the effluents from two units independent of each other. Said column is then supplied:

on the one hand with the light flow or flows originating from the first unit: for example with the liquid from the cold high-pressure separator drum B-2, and/or from the cold medium-pressure separator drum B-4, and optionally the gaseous flow originating from the hot low-pressure separator drum B-5. These flows originating from the reaction effluent from the first unit are supplied separately from each other.

on the other hand, with the light flow or flows originating from the drums operating at low temperature of the second unit: for example either directly with the liquid from the cold high-pressure separator drum B-20, or with the liquid from the cold medium-pressure separator drum B-40, if this exists, and optionally with the gaseous flow originating from the cold low-pressure separator drum B-50, if this exists. The flow or flows originating from the reaction effluent from the second unit are supplied separately and are not mixed with the flows originating from the first unit. Preferably, the supplies are placed with respect to each other in such a way that the cuts are increasingly heavy from the top to the bottom of the column.

on the one hand with the heavy flow or flows originating from the first unit: for example with the liquid flow originating from the hot high-pressure separator drum B-1, and/or from the hot medium-pressure separator drum B-3, and/or from the hot low-pressure separator drum B-5. Typically, the supplies are placed with respect to each other in such a way that the cuts are increasingly heavy from the top to the bottom of the column.

on the other hand, with the heavy flow or flows originating from the second unit, i.e. the liquid flows originating from the hot drums if said drums exist: for example with the liquid flow originating from the hot high-pressure separator drum B-10, and/or from the hot medium-pressure separator drum B-30, and/or from the hot low-pressure separator drum B-50.

The light and heavy flows originating from the separation of the reaction effluent from the second unit are supplied separately and are not mixed with the flows originating from the first unit. Typically, the supplies are placed with respect to each other in such a way that the cuts are increasingly heavy from the top to the bottom of the column.

At least one side-stripping column C-4 (side-stripper) which treats one of the products originating from the main fractionation column C-2: diesel, kerosene or residue can be added to the main fractionation column C-2. This stripper can be supplied with stripping fluid or reboiled using a furnace or an exchanger, the hot fluid of which can be a hot utility or a hot process flow internal or external to the unit. The vapour from the top of this side column returns to the main fractionation column C-2. The bottom of the side column generally constitutes one of the finished products of the unit.

Optionally, a furnace F-2 makes it possible to heat the feedstock or feedstocks supplying the fractionation column C-2.

This column is generally supplied with a stripping fluid at the bottom of the column, generally steam.

Optionally, at least a part of the liquid flows originating from the hot high-pressure separator drum B-10, or from the hot medium-pressure separator drum B-30, or from the hot low-pressure separator drum B-50 of the second unit directly supplies a side-stripping column of the main fractionation section.

Optionally, at least a part of the liquid flows originating from the cold high-pressure separator drum B-20, or from the cold medium-pressure separator drum B-40 directly supplies a side-stripping column of the main fractionation section.

The invention also relates to the process for utilizing said installation.

The advantage of the layout of this common fractionation zone lies in the fact that:
- the fractionation of the two units is common and the investment is minimized
- the energy efficiency of the process is maximized by separately supplying each of the flows produced by the different separator drums of each separation section of each unit; this makes it possible for a person skilled in the art to separately optimize the levels of each supply into the fractionation section.
- it is possible to vary the cut points of the finished products from the second unit, in particular when said unit usually comprises no main fractionation column.

In the process and the installation according to the invention, the reaction sections R-1 and R-10 can comprise one or more reactors arranged in series or in parallel, for example two reactors arranged in series.

Each reactor of a reaction section comprises at least one catalyst bed,

The catalyst can be utilized in a fixed bed or in an expanded bed, or also in an ebullating bed. In the case of a catalyst utilized in a fixed bed, it is possible to arrange several catalyst beds in at least one reactor.

Any catalyst known to a person skilled in the art can be used in the process according to the invention, for example a catalyst comprising at least one element selected from the elements of Group VIII of the periodic table (groups 8, 9 and 10 of the new periodic table) and optionally at least one element selected from the elements of Group VIB of the periodic table (group 6 of the new periodic table).

For implementation of the process according to the invention, it is possible to use a standard hydroconversion catalyst comprising, on an amorphous support, at least one metal or metal compound having a hydro-dehydrogenating function. This catalyst can be a catalyst comprising group VIII metals, for example nickel and/or cobalt, most often in combination with at least one group VIB metal, for example molybdenum and/or tungsten. For example a catalyst comprising 0.5 to 10% by weight nickel (expressed as nickel oxide NiO) and 1 to 30% by weight molybdenum, preferably 5 to 20% by weight molybdenum (expressed as molybdenum oxide MoO3) on an amorphous mineral support can be used. The total content of oxides of metals of Groups VI and VIII in the catalyst is generally comprised between 5 and 40 percent by weight, and preferentially between 7 and 30% by weight. The weight ratio (expressed on the basis of the metal oxides) between Group VI metal(s) and Group VIII metal(s) is generally from approximately 20 to approximately 1, and most often from approximately 10 to approximately 2. The support is, for example, selected from the group formed by alumina, silica, silica-aluminas, magnesia, clays and mixtures of at least two of these minerals. This support can also contain other compounds and, for example, oxides selected from boron oxide, zirconium oxide, titanium oxide and phosphoric anhydride. An alumina support is most often used, and preferentially □ or □□alumina. The catalyst can also contain a promoter element such as phosphorus and/or boron. This element can be introduced into the matrix or preferably have been deposited on the support. Silicon can also be deposited on the support, alone or with phosphorus and/or boron. Preferably, the catalysts contain silicon deposited on a support such as aluminium, optionally with phosphorus and/or boron deposited on the support, and also containing at least one Group VIII metal (Ni, Co) and at least one Group VIB metal (Mo, W). The concentration of said element is usually less than approximately 20% by weight (based on oxide) and most often less than approximately 10%. The concentration of boron trioxide ($B_2O_3$) is usually from approximately 0 to approximately 10% by weight. Another catalyst is a silica-alumina comprising at least one Group VIII metal and at least one Group VIB metal. Another type of catalyst that can be used is a catalyst containing at least one matrix, at least one zeolite Y and at least one dehydrogenating metal. The matrices, metals and additional elements described previously can also be included in the composition of this catalyst. Advantageous zeolites Y are described in patent applications WO00/71641 and EP-911 077 as well as U.S. Pat. Nos. 4,738,940 and 4,738,941. Certain compounds having a basic character, such as basic nitrogen, are well known for significantly reducing the cracking activity of acid catalysts such as silica-aluminas or zeolites. Another type of catalyst that can be used is a catalyst containing noble metals such as platinum or palladium for example.

The type of hydrotreatment required, for example, to form a product of the diesel fuel type, can vary as a function of the type of distillate supply feedstock. For certain types of supplies, the formation of a suitable diesel product can require only a hydrotreatment or hydrocracking of the feedstock in order to reduce the sulphur and nitrogen content in the diesel fuel produced. Other feedstocks will not have acceptable cold flow properties and dewaxing will also be necessary in order to obtain the desired diesel.

Thus, either of the reaction sections can also comprise a hydroisomerization section including catalytic dewaxing. The hydroisomerization consists of converting at least 10%, more precisely at least 50%, more particularly from 10 to 90% of the linear paraffins (n-paraffins) to branched paraffins (i-paraffines) in order to improve the cold properties of the feedstock: typically in order to obtain a cloud point of 00° C. (32° F.) or less, a pour point of 0° C. (32° F.) or less, and/or a cold filter plugging point (CFPP) of 0° C. (32° F.) or less.

In order to implement the hydroisomerization reactions, a catalyst comprising a zeolite, a hydrogenating/dehydrogenating function, and an acid function can be used. In certain forms, the catalyst can include at least one Group VIII metal such as a noble metal (for example, platinum or palladium). In other forms, the catalyst can also include a phosphate-containing silica alumina or a silicate-containing alumina zeolite.

The operating conditions of these hydrotreatment or hydroconversion or hydroisomerization reaction sections R-1 and R-10 are well known to a person skilled in the art:

The temperature of the fixed-bed reaction sections is typically comprised between 200 and 460° C. The average temperature of the catalytic bed (i.e. the arithmetic average of the temperature measurements in the catalytic bed) of the ebullating-bed reaction sections, is typically comprised between 300 and 600° C., preferably between 350° C. and 510° C.

The total pressure is generally comprised between 1.5 and 35 MPa, preferably between 2 and 25 MPa.

The overall hourly space velocity of liquid feedstock for each catalytic step is generally comprised between 0.1 and 20, and generally between 0.15 and 15.

The quantity of hydrogen with respect to the liquid feedstock is generally comprised between 50 and 2500 $Nm^3/m^3$.

The purity of the hydrogen used in the process according to the invention is generally comprised between 50 and 100% by volume.

The reaction section of the hydroconversion unit R-1 can be implemented in one step, or in one step with recycling of a part of the unconverted product, or in several steps, each step having one or more reactors and treating a part of the unconverted product. When the reaction section is implemented in two steps, the separation section is generally common, at least in part, as well as the fractionation section.

The effluent from the reaction section R-1 or R-10 is constituted by a hydrocarbon-containing cut, generally in mixed phase, comprising gases originating from cracking, and in particular $H_2S$ and $NH_3$ originating from reactions in the reaction section, in proportion to the level of sulphur and nitrogen contained in the feedstock, optionally $CO_2$ and other gases, light cuts such as the LPGs originating from side reactions, and at least naphtha, and optionally the following hydrocarbon-containing cuts: diesel, kerosene, unconverted residue, etc., depending on the nature of the feedstock and the type of reaction in R-1 or R-10.

The separation column C-1, called stripper or sometimes stabilization column, aims to remove the gases originating from cracking (generally called acid gases), and in particular the $H_2S$ and/or the light compounds originating from reactions in the reaction section. This column is preferably stripped by means of any stripping gas such as for example a gas containing hydrogen or steam. Steam is preferably used for carrying out said stripping. In a variant of the invention, the separation column C-1 can be reboiled using a furnace or an exchanger, the hot flow of which can be a hot utility or a hot process flow internal or external to the unit. The total pressure is typically comprised between 0.4 MPa and 2.0 MPa, generally between 0.6 and 2.0 MPa, preferably between 0.7 and 1.8 MPa. Advantageously, the pressure of this separation column is sufficiently high for the gases originating from this separation, previously purified of the $H_2S$ that they would contain, to be able to be reinjected into the combustible gas network of the site.

The main atmospheric fractionation column C-2 is also preferably supplied by means of any stripping gas, preferably steam. The total pressure is generally comprised between 0.1 MPa and 0.4 MPa, preferably between 0.1 MPa and 0.3 MPa. The cut point of the atmospheric residue is typically adjusted between 300° C. and 400° C., preferably between 340° C. and 380° C. The cuts drawn off from the column are typically diesel, kerosene and naphtha.

The side-stripping column(s) C-4, C-5 and C-6 operate under the following pressure conditions: total pressure comprised between 0.1 MPa and 0.4 MPa, preferably comprised between 0.1 and 0.3 MPa.

The fraction from the top of the main fractionation column C-2 contains the residual acid gases which are compressed in the compressor K-3 before being exported to the acid gas treatment section (generally amine washing or a washing column). This fraction is then directed to a combustible gas network.

According to a variant of the invention, at least a part of fraction from the top of the column C-2 containing the residual acid gases is sent to an amine absorber or a washing column C-7 operating at very low pressure, in order to remove at least a part of the $H_2S$. This part of the top fraction can then be used as a minority of the fuel in the furnaces R-1 or R-10 of the reaction sections.

According to a variant of the invention, the residual gases can be directed, optionally after amine washing, to a section for recovery of the liquefied petroleum gases (LPG) generally constituted by several fractionation columns, for example a deethanizer and a debutanizer, this section being called "gas plant".

The hot high-pressure separator drums B-1 and B-10 are operated at a slightly lower pressure, for example a pressure 0.1 MPa to 1.0 MPa lower than that of the reactor R-1 and R-10, preferably at a pressure comprised between 1.4 and 35 MPa, preferably between 1.9 and 25 MPa. The temperature of the hot separator drum is generally comprised between 200° C. and 450° C., preferably between 250° C. and 380° C., and very preferably between 250° C. and 360° C.

The cold high-pressure separator drums B-2 and B-20, the feedstock of which is the gaseous flow originating from the hot separator drums B-1 and B-10 respectively, are operated at a slightly lower pressure than B-1 and B-10 respectively, for example a pressure 0.01 MPa to 1.0 MPa lower than that of B-1 and B-10, preferably at a pressure comprised between 1.3 and 35 MPa, preferably between 1.9 and 25 MPa. The gaseous effluents originating from B-2 and B-20 respectively, called recycled hydrogen, are optionally washed in the columns C-3 and C-30 respectively, then compressed in the compressors K-1 and K-10 respectively.

The temperature of the cold high-pressure separator drums B-2 and B-20 is generally as low as possible given the cooling means available on site. This is so as to maximize the purity of the recycled hydrogen, preferably between 20 and 100° C.

According to a variant of the invention, the liquids originating from the cold high-pressure separator drums B-2 and B-20 are expanded in a valve or a turbine and directed into the cold medium-pressure separator drums B-4 and B-40 respectively. The total pressure of the latter is preferentially that required for efficiently recovering the hydrogen comprised in the gaseous fraction separated in these drums. This recovery of the hydrogen is preferably carried out in an adsorption unit by pressure inversion. The pressure of the drums B-4 and B-40 is generally comprised between 1.0 MPa and 5.0 MPa, preferably comprised between 1.5 MPa and 3.5 MPa.

Still according to a variant of the invention, the liquid flow originating from the hot high-pressure separator drums B-1 and B-10 is directed via a valve or a turbine into the hot medium-pressure separator drums B-3 and B-30 respectively. The pressure of the latter is selected so as to be able to supply the cold medium-pressure separator drums B-4 and B-40 respectively with the separate gaseous flow into the hot high-pressure separator drums B-3 et B-30 respectively.

According to a preferred variant, a part of the liquid originating from the cold medium-pressure separator drums B-4 and/or B-40, can be reinjected into B-2 and/or B-20 respectively in order to promote the complete dissolution of the light hydrocarbons therein and to maximize the hydrogen purity of the gas recycled from the reaction section.

Optionally, the liquid flow originating from the hot medium-pressure separator drums B-3 and/or B-30 is expanded and directed to the hot low-pressure separator drums B-5 and/or B-50 respectively. The pressure is selected sufficiently high for the gaseous effluent originating from this separation to be able to be directed either to the separation column C-1, or, previously purified of the $H_2S$ that it may contain, to the combustible gas network of the site. The total pressure of these drums is typically comprised between approximately 0.2 MPa and approximately 2.5 MPa, generally between 0.3 and 2.0 MPa, preferably between 0.4 and 1.8 MPa.

Feedstocks:

Very varied hydrocarbon-containing feedstocks can be treated in the units to which the invention relates. Said feedstocks can be of petroleum origin or synthetic feedstocks from a mineral or biological source. The range extends from naphtha to vacuum residue, passing through all the intermediate cuts, or even a mixture of different cuts.

In general, the feedstocks contain 5% or less of compounds the boiling point of which is less than 120° C. (i.e. 95% percent of the compounds present in the feedstock have a boiling point great than 120° C.).

In the case of naphtha, the boiling point T5 is generally approximately 120° C. and in the case of diesel approximately 150° C. In the case of atmospheric residue, the boiling point T5 is typically greater than 300° C., preferably between 340° C. and 380° C.

In the case of vacuum residue, the boiling point T5 is typically between 450° C. and 600° C., preferably between 500° C. and 550° C. Light vacuum distillate (Light Vacuum gasoil LVGO) is characterized by a distillation range comprised between 300° C. and 430° C., preferably between 340° C. and 400° C. Heavy vacuum distillate (Heavy Vacuum gasoil HVGO) is characterized by a distillation range comprised between 400° C. and 600° C., preferably between 440° C. and 550° C.

The feedstocks that can be used are thus in a wide range of boiling points.

The hydrocarbon-containing feedstocks can be of the atmospheric distillate type (naphtha, gasoline, kerosene and gasoils), vacuum distillate, for example gasoils, originating from the direct distillation of crude or conversion units such as FCC, coker or visbreaking, such as LCO (light cycle oil) light oil originating from a catalytic cracking unit, but can also be feedstocks originating from aromatic extraction units, lubricating oil bases or originating from solvent dewaxing of lubricating oil bases, or also distillates originating from fixed-bed or ebullating-bed desulphurization or hydroconversion processes of ATR (atmospheric residues) and/or of VR (vacuum residues) and/or of deasphalted oils, or also the feedstock can be a deasphalted oil, effluents from a Fischer-Tropsch unit, or also any mixture of the abovementioned feedstocks. The hydrocarbon-containing feedstock can also be vegetable oils or animal fats. The above list is not limitative.

The feedstocks of the hydroconversion units generally contain at least 10% by volume, generally at least 20% by volume and often at least 80% by volume of compounds boiling above 340° C.

The nitrogen content of the feedstocks treated in the hydroconversion processes is usually greater than 500 ppm by weight, generally comprised between 500 and 10,000 ppm by weight.

The sulphur content of the feedstocks treated in the hydroconversion processes is usually comprised between 0.01 and 6% by weight, generally comprised between 0.2 and 5% by weight. The feedstock can optionally contain metals. The cumulative nickel and vanadium content of the feedstocks treated in the hydroconversion processes is preferably less than 10 ppm by weight, preferably less than 5 ppm by weight and even more preferably less than 2 ppm by weight. The asphaltenes content is generally less than 3000 ppm by weight.

The feedstocks of the hydrotreatment units generally contain at least 10% by volume, generally at least 20% by volume and often at least 80% by volume of compounds boiling above 150° C.

The nitrogen content of the feedstocks treated in the hydrotreatment processes is usually greater than 100 ppm by weight, generally comprised between 100 and 10,000 ppm by weight.

The sulphur content of the feedstocks treated in the hydrotreatment processes is usually comprised between 0.01 and 5% by weight. The feedstock can optionally contain metals. The cumulative nickel and vanadium content of the feedstocks treated in the hydrotreatment processes is preferably less than 300 ppm by weight.

The asphaltenes content is generally less than 15% by weight.

ADVANTAGES OF THE INVENTION

In the process according to the invention, advantageously compared with the processes known from the prior art:
the number of columns allowing the fractionation of the products having at least two reaction sections is reduced with the sharing of the fractionation section;
- the separations of the products originating from the unit having no main fractionation section are improved, in particular the separation between the by-products and the main product, for example the separation between diesel and kerosene;
- the cut point of each intermediate product can be modified in the common fractionation section. Thus, depending on the seasons, it is not necessary to adjust the cut point and the feedstock capacity of a unit which had no fractionation section dedicated to the intermediate cut or cuts according to the prior art.
- The presence of at least one side-stripping column, moreover, makes it possible to adjust the properties of the intermediate products originating from the main fractionation section.

The installation and the process according to the invention thus make it possible to obtain significant flexibility in the cut points for the intermediate products, compared with the units operated independently.

The process according to the invention makes it possible in particular to:
- produce an equivalent quantity of upgradable products while having the possibility of varying the cut points of finished products.
- maximize the energy efficiency of the process by separately supplying each of the flows produced by the different separator drums of each unit to the suitable point or points in the fractionation section.

The implementation of the installation according to the invention, moreover, thus makes it possible to reduce the number of items of equipment during construction.

In fact, the invention is advantageously implemented for units not usually equipped with a column allowing the main fractionation of the products of the unit. According to the invention, the flows originating from the separator drums of these units can be treated in the fractionation column of the main products common with another unit, thus making it possible to vary their cut points without additional investment.

Compared with the usual refinery layout, the process according to the invention makes it possible to obtain the same yield of hydrocarbon-containing cuts while minimizing the investment costs.

The properties of the finished products of each of the units must preferentially be equivalent, i.e. they must have the same destination: typically either directly upgrading to finished product in the same pool, or treatment in the same refining unit downstream, or recycling to the same place.

DESCRIPTION OF THE FIGURES

Figure 1:
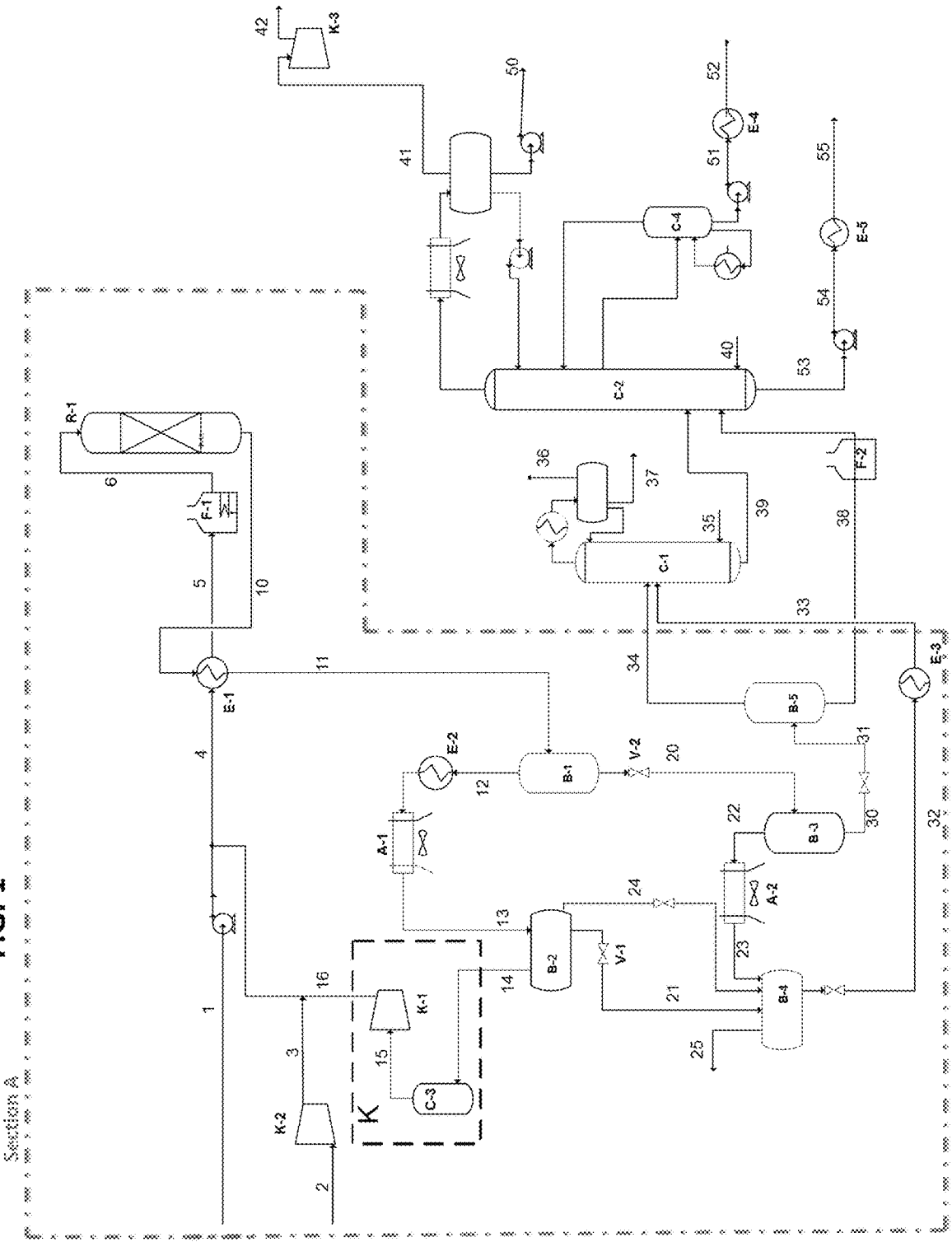
FIG. 1: Layout of a hydrocracking unit according to the prior art

FIG. 1:

FIG. 1 shows a hydrocracking unit implemented according to the prior art.

The feedstock 1 composed of hydrocarbons of oil origin or synthetic hydrocarbons from a mineral or biological source is mixed with hydrogen then sent into a hydrocracking section. This section can comprise one or more fixed-bed or ebullating-bed reactors. Each reactor can comprise one or more catalyst beds carrying out hydrocracking of the hydrocarbons in the feedstock to lighter hydrocarbons.

The addition of hydrogen is supplied via the line 2 and the compressor K-2 then the line 3, and mixed with the recycled hydrogen originating from the compressor K-1 via the line 16 before being mixed with the feedstock 1.

The mixture is introduced into a feedstock-effluent exchanger (E-1) via the line 4. The exchanger E-1 makes it possible to preheat the feedstock by means of the effluent from the hydrocracking reactor R-1. After this exchange, the feedstock is conveyed via the line 5 into a furnace F-1 making it possible to reach the temperature level necessary for the hydrocracking reaction, then the hot feedstock is sent, via the line 6, into at least one reactor R-1 comprising, for example, a hydroprocessing or hydrocracking catalyst.

The effluent from the reaction section at the outlet from the reactor R-1 is sent to the exchanger E-1, then via the line 11 to the hot high-pressure separator drum B-1. A gaseous fraction is separated in this drum and recovered via the line 12. The hydrocracked liquid fraction is recovered at the bottom via the line 20.

The gaseous fraction from the hot high-pressure separator drum B-1 comprises unreacted hydrogen, any H$_2$S formed during the reaction, as well as light hydrocarbons originating from the side reactions of the hydrocracking reaction. After cooling in an exchanger E-2 and an air condenser A-1, this fraction is conveyed, via the line 13, into a cold high-pressure separator drum B-2 making it possible to carry out both a gas-liquid separation and optionally a decantation of the aqueous liquid phase, originating from the washing water optionally injected at high pressure upstream of E-2 and/or E-1. The liquid hydrocarbon-containing phase, after expansion in the liquid valve or turbine V-1, is directed into a cold medium-pressure separator drum B-4 via the line 21. The aqueous liquid phase, after expansion in a valve, is also directed into a cold medium-pressure separator drum B-4 via the line 24.

The liquid fraction from the hot high-pressure separator drum B-1, after expansion in the liquid valve or turbine V-2, is directed into a hot medium-pressure separator drum B-3 via the line 20. A gaseous fraction is separated in this drum and recovered via the line 22. Said gaseous fraction comprises unreacted hydrogen, optionally H$_2$S, as well as, generally, light hydrocarbons originating from the conversion of the hydrocarbons of the feedstock in the reaction section R-1. After cooling in an air condenser A-2, this fraction is conveyed via the line 23, into the cold medium-pressure separator drum B-4.

The gaseous effluent originating from the drum B-4 constitutes a hydrogen-rich gaseous fraction purged via the line 25.

The gaseous fraction originating from the cold high-pressure separator drum B-2 is generally sent via the line 14 to an amine absorber or a washing column C-3 making it possible to remove at least a part of the H$_2$S that it contains. The gaseous fraction containing hydrogen is then recycled via the lines 15 and 16 to the hydrocracking reactor, after compression by means of the compressor K-1 and mixing with the feedstock 1.

The liquid fraction recovered at the bottom of the hot medium-pressure separator drum B-3 is optionally expanded and directed via the lines 30 and 31 to the hot low-pressure separator drum B-5.

All of these items of equipment and the associated lines can be grouped together in section A.

The liquid effluent originating from the drum B-4 constitutes the light liquid fraction originating from the reaction effluent and supplies the stripper C-1 via the lines 32 and 33 after optionally being preheated in the exchanger E-3.

A gaseous fraction is optionally separated in the drum B-5. This gaseous fraction can then supply the stripper C-1 via the line 34 or be mixed with the liquid fraction originating from B-3 via the line 33.

The stripper C-1 is supplied with the stripping steam via the line 35.

At the top of the stripper, a gaseous fraction (generally called acid gas) is recovered via the line 36, and a naphtha having a final boiling point most often greater than 100° C. via the line 37. The liquid recovered at the bottom of the stripper via the line 39 is sent to the main fractionation column C-2, without it being necessary to reheat it in a furnace or an exchanger.

The liquid fraction recovered at the hot medium-pressure drum B-3 and/or optionally the liquid fraction originating from B-5 constitutes the heavy fraction originating from the reaction effluent and, after preheating in the furnace F-2, supplies the main fractionation column C-2 via the line 38, without being subjected to an operation for separation of the acid gases in a stripping column or a reboiled separation column.

The main fractionation column C-2 is typically operated at low pressure, for example 0.19 MPa at the top of the column. The heat necessary for the separation is preferentially supplied by the temperature of the hot separator drums B-3 and/or B-5. This column C-2 is also supplied with the stripping steam via the line 40.

The top fraction recovered via the line 41 contains the residual acid gases which are compressed in the compressor K-3 before being exported to the acid gas treatment section (generally an amine washing or a washing column) before being directed to a combustible gas network.

The product obtained via the line 50 is constituted by naphtha cuts having a final boiling point most often less than 200° C.

The intermediate fraction originating from the main fractionation column has its properties adjusted in the side column C-4. Said side column is supplied with a stripping fluid, for example steam. The intermediate fraction is extracted via the line 51, then cooled, for example, by means of an exchanger E-4, then recovered via the line 52. It is, for example, a gasoil cut having a distillation temperature at 95% by volume less than 360° C.

The heavy fraction originating from the main fractionation column via the line 53 is also cooled by means of the exchanger E-5, for example. The fraction thus obtained via the line 55 is a vacuum gasoil having cut points close to the initial feedstock.

Figure 2:
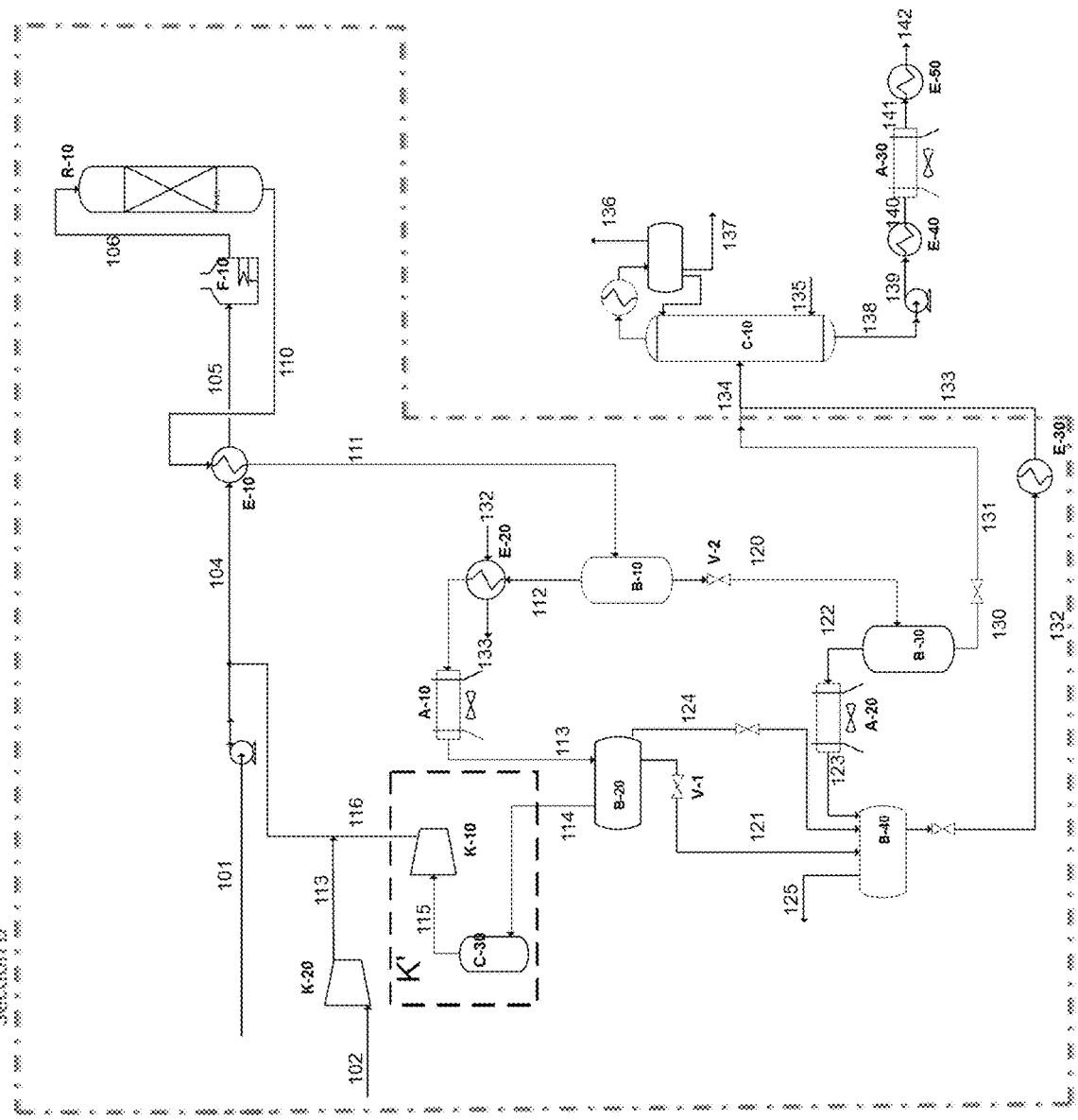
FIG. 2: Layout of a diesel hydrotreatment unit according to the prior art

FIG. 2:

FIG. 2 shows a diesel hydrotreatment unit implemented according to the prior art.

The feedstock 101 composed of hydrocarbons of oil origin or synthetic hydrocarbons from a mineral or biological source is mixed with hydrogen then sent into a hydrotreatment section. This section can comprise one or more reactors, generally fixed-bed or ebullating-bed. Each reactor can comprise one or more catalyst beds carrying out the hydrotreatment of the feedstock.

The addition of hydrogen is supplied via the line 102 and the compressor K-20 then the line 103, and mixed with the recycled hydrogen originating from the compressor K-10 via the line 116 before being mixed with the feedstock 101.

The mixture is introduced into a feedstock-effluent exchanger (E-10) via the line 104. The exchanger E-10 makes it possible to preheat the feedstock by means of the effluent from the hydrotreatment reactor R-10. After this exchange, the feedstock is conveyed via the line 105 into a furnace F-10 making it possible to reach the temperature level necessary for the hydrotreatment reaction, then the hot feedstock is sent, via the line 106, into at least one reactor R-10 generally comprising at least one hydrodesulphurization catalyst.

The effluent from the reaction section at the outlet from the reactor R-10 is sent to the exchanger E-10, then via the line 110 to the hot high-pressure separator drum B-10. A gaseous fraction is separated in this drum and recovered via the line 112. The hydrotreated liquid fraction is recovered at the bottom via the line 120. Said gaseous fraction comprises unreacted hydrogen, any $H_2S$ formed during the reaction, as well as light hydrocarbons originating from the side reactions of the hydrotreatment reaction. After cooling in an exchanger E-20 and an air condenser A-10, this fraction is conveyed, via the line 113, into a cold high-pressure separator drum B-20 making it possible, both to carry out a gas-liquid separation and optionally a decantation of the aqueous liquid phase, originating from the washing water optionally injected at high pressure upstream of E-20 and/or E-10. The liquid hydrocarbon-containing phase, after expansion in the liquid valve or turbine V-10, is directed into a cold medium-pressure separator drum B-40 via the line 121.

The aqueous liquid phase, after expansion in a valve, is also directed into a cold medium-pressure separator drum B-40 via the line 124.

The liquid effluent originating from the drum B-10, after expansion in the liquid valve or turbine V-20, is directed into a hot medium-pressure separator drum B-30 via the line 120. A gaseous fraction is separated in this drum and recovered via the line 122. Said gaseous fraction comprises unreacted hydrogen, optionally $H_2S$, as well as, generally, light hydrocarbons. After cooling in an air condenser A-20, this fraction is conveyed via the line 123, into the cold medium-pressure separator drum B-40.

The gaseous effluent originating from the drum B-40 constitutes a hydrogen-rich gaseous fraction purged via the line 125.

The gaseous fraction originating from the cold high-pressure separator drum B-20 is generally sent via the line 14 to an amine absorber or a washing column C-30 making it possible to remove at least a part of the $H_2S$ that it contains. The gaseous fraction containing hydrogen is then recycled via the lines 115 and 116 to the reaction section, after compression by means of the compressor K-10 and mixing with the feedstock 101.

All of these items of equipment and associated lines can be grouped together in section B.

The liquid effluent originating from the drum B-40 constitutes the light liquid fraction originating from the reaction effluent and supplies the stripper C-10 via the lines 132 and 133 after optionally being preheated in the exchanger E-30.

The liquid fraction recovered at the bottom of the hot medium-pressure drum B-30 constitutes the heavy liquid fraction originating from the reaction effluent. It supplies the stripper C-10 via the lines 130 and 131 after mixing with the light liquid fraction originating from the drum B-40.

The stripper C-10 is supplied with the stripping steam via the line 135.

At the top of the stripper, a gaseous fraction (generally called acid gas) is recovered via the line 136, and a naphtha having a final boiling point most often greater than 100° C. and less than 200° C. via the line 137. The liquid recovered at the bottom of the stripper via the line 139 is sent to storage via the line 142 after cooling in the exchangers E-40, E-50 and in the air condenser A-30.

Figure 3:
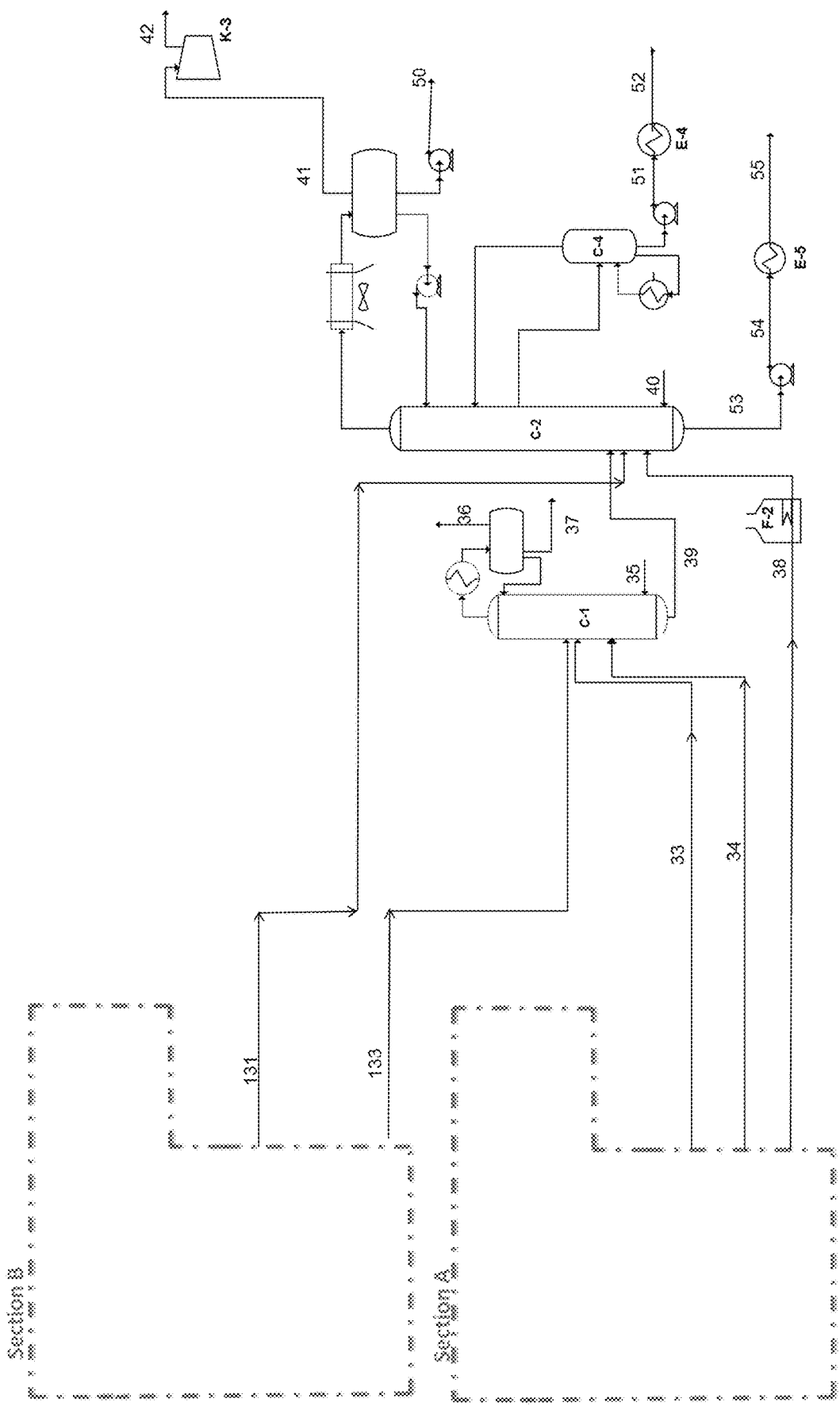
FIG. 3: Installation according to the invention with shared fractionation of the diesel hydrocracking and hydrotreatment units and common fractionation section with separation column C1 treating the light fractions.

FIG. 3:

FIG. 3 shows the installation according to the invention with a common fractionation section comprising an atmospheric separation column C-1 (stripper) treating the light fractions and a main atmospheric fractionation column.

Section A of the hydrocracking unit is identical to section A described in FIG. 1 and section B of the diesel hydrotreatment unit is identical to section B in FIG. 2. The liquid effluent originating from cold medium-pressure separator drum B-4 constitutes the light liquid fraction originating from the reaction effluent from the hydrocracking unit and supplies the stripper C-1 via the lines 32 and 33 after optionally being preheated in the exchanger E-3.

A gaseous fraction is optionally separated from the heavy fraction originating from the reaction effluent from the hydrocracking unit in the hot low-pressure drum B-5.

This gaseous fraction can then supply the stripper C-1 via the line 34 or be mixed with the liquid fraction originating from B-3 via the line 33.

The liquid effluent originating from the drum B-40 constitutes the light liquid fraction originating from the reaction effluent of the diesel hydrotreatment unit and supplies the stripper C-1 via the lines 132 and 133 after being preheated in the exchanger E-30.

The stripper C-1 is supplied with the stripping steam via the line 35.

At the top of the stripper, a gaseous fraction (generally called acid gas) is recovered via the line 36, and a naphtha having a final boiling point most often greater than 100° C. via the line 37. The liquid recovered at the bottom of the stripper via the line 39 is sent to the main fractionation column C-2, without it being necessary to reheat it in a furnace or an exchanger.

The liquid fraction recovered at the hot medium-pressure drum B-3 and/or optionally the liquid fraction originating from B-5 constitutes the heavy fraction originating from the reaction effluent from the hydrocracking unit and, after preheating in the furnace F-2, supplies the main fractionation column C-2 via the line 38, without being subjected to an operation for the separation of the acid gases in a stripping column or a reboiled separation column.

The liquid fraction recovered at the bottom of the hot medium-pressure drum B-30 constitutes the heavy liquid fraction originating from the reaction effluent from the diesel hydrotreatment unit and directly supplies the main fractionation column C-2 via the line 131, without being subjected to an operation for the separation of the acid gases in a stripping column or a reboiled separation column. The supply takes place at a separate level from the supply originating from the hydrocracking unit. The supply can be introduced either above or below the supply from the hydrocracking unit, but must be separate.

The main fractionation column C-2 is typically operated at low pressure, for example 0.29 MPa at the top of the column. The heat necessary for the separation is preferentially supplied by the temperature of the hot separator drums B3 and/or B-5 and B-30 and optionally B-50. This column C-2 is also supplied with stripping steam via the line 40.

The top fraction recovered via the line 41 contains the residual acid gases which are compressed in the compressor K-3 before being exported to the acid gas treatment section (generally an amine washing or a washing column) before being directed to a combustible gas network.

The product obtained via the line 50 is constituted by naphtha cuts having a final boiling point most often less than 200° C.

The intermediate fraction originating from the main fractionation column has its properties adjusted in the side-stripping column C-4. Said column is supplied with a stripping fluid. The intermediate fraction is extracted via the line 51, then cooled, for example, by means of an exchanger E-4. It is, for example, a gasoil cut having a distillation temperature at 95% by volume less than 360° C. The intermediate fraction is constituted by the mixture of the intermediate fraction originating from the hydrocracking unit and the intermediate fraction originating from the diesel hydrotreatment unit.

The heavy fraction originating from the main fractionation column via the line 53 is also cooled by means of the exchanger E-5, for example. The fraction thus obtained via the line 55 is a vacuum gasoil having cut points close to the initial feedstock of the hydrocracking unit.

Figure 4:
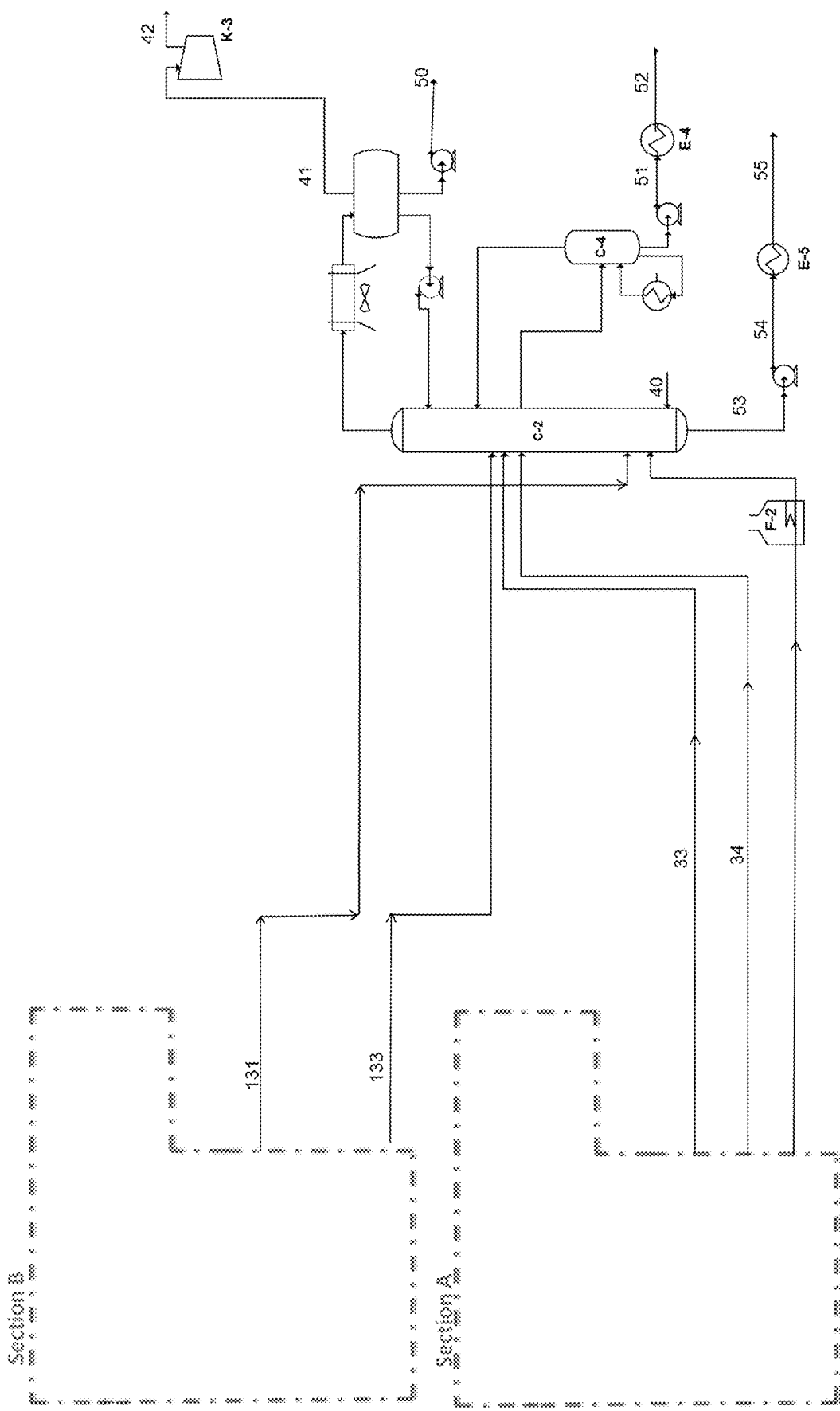
FIG. 4: Installation according to the invention with shared fractionation of the diesel hydrocracking and hydrotreatment units and common fractionation section without separation column C1 treating the light fractions.

FIG. 4 shows the embodiment in which the common fractionation section does not contain a column for separation of the light fractions (stripper or stabilization column) C-1. The common fractionation section comprises only one main atmospheric fractionation column C-2 treating the effluents from two units independent of each other and a side-stripping column C-4.

Said column is then supplied:
- on the one hand, with the light flow or flows originating from the first unit: for example with the liquid from the cold high-pressure separator drum B-2, and/or from the cold medium-pressure separator drum B-4 via the line 33, and optionally the gaseous flow originating from the hot low-pressure separator drum B-5 via the line 38. These flows originating from the reaction effluent from the first unit are supplied separately from each other.
- on the other hand, with the light flow or flows originating from the drums operating at low temperature of the second unit: for example either directly with the liquid from the cold high-pressure separator drum B-20, or with the liquid from the cold medium-pressure separator drum B-40, if this exists, via the line 133 and optionally with the gaseous flow originating from the cold low-pressure separator drum B-50, if this exists (not shown here). The flows originating from the reaction effluent from the second unit are supplied separately and are not mixed with the flows originating from the first unit. Typically, the supplies are placed with respect to each other in such a way that the cuts are increasingly heavy from the top to the bottom of the column.
- on the one hand, with the heavy flow or flows originating from the first unit: for example with the liquid flow originating from the hot high-pressure separator drum B-1, and/or from the hot medium-pressure separator drum B-3, and/or from the hot low-pressure separator drum B-5, via the line 34. Typically, the supplies are placed with respect to each other in such a way that the cuts are increasingly heavy from the top to the bottom of the column.
- on the other hand, with the heavy flow or flows originating from the second unit, i.e. the liquid flows originating from the hot drums if said drums exist: for example with the liquid flow originating from the hot high-pressure separator drum B-10, and/or from the hot medium-pressure separator drum B-30, and/or from the hot low-pressure separator drum B-50, via the line 131.

The light and heavy flows originating from the separation of the reaction effluent from the second unit are supplied separately and are not mixed with the flows originating from the first unit. Typically, the supplies are placed with respect to each other in such a way that the cuts are increasingly heavy from the top to the bottom of the column.

The top fraction recovered via the line 41 contains the residual acid gases which are compressed in the compressor K-3 before being exported to the acid gas treatment section (generally an amine washing or a washing column) before being directed to a combustible gas network.

The product obtained via the line 50 is constituted by naphtha cuts having a final boiling point most often less than 200° C.

The intermediate fraction originating from the main fractionation column has its properties adjusted in the side-stripping column C-4. Said column is supplied with a stripping fluid. The intermediate fraction is extracted via the line 51, then cooled, for example, by means of an exchanger E-4. It is, for example, a gasoil cut having a distillation temperature at 95% by volume less than 360° C. The intermediate fraction is constituted by the mixture of the intermediate fraction originating from the hydrocracking unit and the intermediate fraction originating from the diesel hydrotreatment unit.

The heavy fraction originating from the main fractionation column via the line 53 is also cooled by means of the exchanger E-5, for example. The fraction thus obtained via the line 55 is a vacuum gasoil having cut points close to the initial feedstock of the hydrocracking unit.

A furnace F-2 optionally makes it possible to heat the feedstock or feedstocks supplying the fractionation column C-2. This column is supplied with a stripping fluid at the bottom of the column, generally steam, introduced via the line 40.

EXAMPLES

Example 1 (According to the Prior Art)

The process implemented in the example involves:
- a hydrocracking unit for a hydrocarbon-containing feedstock constituted by a mixture of vacuum distillate and heavy gasoil originating from a coker unit (HCGO) with a capacity of 31 0003 BPSD,
- a diesel hydrotreatment unit for a hydrocarbon-containing feedstock constituted by a mixture of gasoil (Straight Run GO) and light vacuum distillate (LVGO) and light gasoil originating from a coker unit (LCGO) with a capacity of 33,500 BPSD.

The role of the reaction section of the hydrocracking unit is to crack, as well as to desulphurize, denitrogenize and saturate the olefins in the feedstock.

The role of the reaction section of the diesel hydrotreatment unit is to desulphurize, denitrogenize and saturate the olefins in the feedstock.

The feedstocks used in this example have the following properties.

TABLE 1 properties of the feedstocks

| Properties | Hydrocracking Unit | Diesel Hydrotreatment Unit |
|---|---|---|
| Flow rate, t/h | 186.3 base 100 | 198.8 base 100 = 106.7 |
| Density @ 15° C., kg/m$^3$ | 923 | 899 |
| Molecular Weight, kg/mol | 372 | 223 |
| Sulphur content, % by weight | 2.2 | 2.6 |
| Nitrogen content, ppm by weight | 1,800 | 1,600 |
| Carbon residue, Conradson method, % by weight | 1.0 max | — |
| ASTM D86 Distillation, vol % | | |
| IBP, ° C. | 313 | 198 |
| 10%, ° C. | 362 | 236 |
| 30%, ° C. | 386 | 268 |
| 50%, ° C. | 406 | 297 |
| 70%, ° C. | 438 | 324 |
| 90%, ° C. | 488 | 353 |
| FBP, ° C. | 542 | 396 |

The hydrocracking and diesel hydrotreatment units are first implemented independently of each other.

The layout of the hydrocracking unit is as follows: reaction section in two steps, then separation section common to the two steps, then fractionation section, constituted by a stripping column and an acid fractionation column. The stripper C-1 is supplied with the light phase originating from the reaction section originating from the mixture of liquid from the cold MP separator drum B-4 with the vapour phase from the hot LP separator drum B-5.

The atmospheric fractionation column is supplied with the liquid from the bottom of the stripper and with the heavy fraction originating from the reaction section constituted by the liquid from the hot LP separator drum B-5.

The fractionation column is constituted by a main column and two side strippers, one C-4 for the kerosene cut (150° C.-193° C.) and the other C-5 for the gasoil cut (193° C.-371° C.).

The products from the fractionation column are an unconverted oil (UCO), gasoil and kerosene which are mixed with the diesel pool and non-stabilized naphtha that will be treated in a downstream section.

The layout of the diesel hydrotreatment unit is as follows: reaction section, then separation section, then fractionation section constituted by a stripping column that produces a non-stabilized naphtha cut and a gasoil cut conforming to the specifications, sent to the diesel pool. The stripper C-10 is supplied with the mixture of the light fraction originating from the reaction section, constituted by the liquid from the cold MP separator drum B-40 and the heavy fraction originating from the reaction section constituted by the liquid from the hot MP separator drum B-30 (cf. FIG. 2).

The operating conditions of the reaction sections are as follows:

TABLE 2

Operating conditions of the reaction sections:

| | Diesel Hydrotreatment Unit | Hydrocracking |
|---|---|---|
| Overall hourly space velocity of liquid feedstock, h$^{-1}$ | 1.0 | 1.7 (HDT 1$^{st}$ stage) 3.00 (HCK 1$^{st}$ stage) 2.0 (HCK 2$^{nd}$ stage) |

The operating conditions of the separation section of each of the two units are as follows:

TABLE 3

Operating conditions for the separator drums

| Operating parameters | | Hydrocracking Separation Section | Diesel Hydrotreatment Separation Section |
|---|---|---|---|
| Hot High Pressure Separator | | | |
| Temperature | ° C. | 330 | 275 |
| Pressure | MPa g | 13.61 | 13.00 |
| Cold High Pressure Separator | | | |
| Temperature | ° C. | 55 | 55 |
| Pressure | MPa g | 13.6 | 12.70 |
| Hot Medium Pressure Separator | | | |
| Temperature | ° C. | 337 | 283 |
| Pressure | MPa g | 2.63 | 2.58 |
| Cold Medium Pressure Separator | | | |
| Temperature | ° C. | 55 | 77 |
| Pressure | MPa g | 2.55 | 2.55 |
| Hot Low Pressure Separator | | | |
| Temperature | ° C. | 339 | — |
| Pressure | MPa g | 0.96 | — |

Example 2 (According to the Invention

The two units are then implemented, according to the invention, with a common fractionation section where the different liquid and gaseous flows originating from the separator drums are supplied to the suitable points in the fractionation section.

This confers the arrangement according to FIG. 3 but with two side-strippers: a side-stripper C-4 on the kerosene cut and a side-stripper C-5 on the diesel cut, the products on which are mixed before going to diesel storage.

The stripper C-1 is supplied:
with the light phase originating from the reaction section of the HCK, originating from the mixture of liquid from the cold MP separator drum B-4 with the vapour phase from the hot LP separator drum B-5
and with the light fraction originating from the reaction section of the HDT, constituted by the liquid from the cold MP separator drum B-40.

The fractionation column is supplied:
with the liquid from the bottom of the stripper C-1
with the heavy fraction originating from the reaction section of the HCK constituted by the liquid from the hot LP separator drum B-5,
and with the heavy fraction originating from the reaction section of the HDT constituted by the liquid from the hot MP separator drum B-30.

The operating conditions of the columns are summarized in Table 4.

TABLE 4

Operating conditions of the fractionation sections:

| Operating parameters | | Hydrocracking Fractionation Section | Diesel Hydrotreatment Fractionation Section | Diesel Hydrotreatment + Hydrocracking Fractionation Section |
|---|---|---|---|---|
| Stripping column | | | | |
| Top temperature | ° C. | 118 | 180 | 122 |
| Reflux temperature | ° C. | 55 | 222 | 55 |
| Bottom temperature | ° C. | 178 | 270 | 180 |
| Top pressure | MPa | 0.90 | 1.36 | 0.90 |
| Number of actual trays | | 13 | 30 | 18 |
| Light fraction from the HCK | | Tray 6 | — | Tray 6 |
| Light fraction from the HDT | | — | Tray 6 | Tray 8 |
| Heavy fraction from the HDT | | — | | — |
| Main Fractionation Column | | | | |
| Top temperature | ° C. | 114 | — | 112 |
| Reflux temperature | ° C. | 45 | — | 45 |
| Bottom temperature | ° C. | 352 | — | 344 |
| Top pressure | MPa | 0.19 | — | 0.19 |
| Number of actual trays | | 86 | — | 86 |
| Kerosene Draw-off | | Tray 27 | — | Tray 27 |
| Liq bottom stripper C-1 | | Tray 30 | — | Tray 30 |
| Heavy fraction from the HDT | | — | — | Tray 40 |
| Gasoil draw-off | | Tray 42 | — | Tray 42 |
| Heavy fraction from the HCK | | Tray 66 | — | Tray 66 |

The properties of the finished products are compared according to the different fractionation layouts.

TABLE 5

Property of the finished products

| | Units simulated separately according to the prior art | | | According to the invention |
|---|---|---|---|---|
| | Dedicated Fractionation Hydrotreatment | Dedicated Fractionation Hydrocracking | Properties of the mixture of the products of Hydrocracking and Diesel Hydrotreatment | Common Diesel Hydrotreatment and Fractionation Hydrocracking |
| Non-stabilized Naphtha | | | | |
| Flow rate, t/h | 0.8 | 10.9 | 11.7 | 9.5 |
| Density @ 15° C., kg/m$^3$ | 749 | 720 | 722 | 721 |
| Molecular Weight, kg/mol | 92.32 | 97.05 | 96.65 | 97.06 |
| Final boiling point, T° C. | 214 | 144 | 183 | 144 |
| Sulphur content, ppm by weight | 50 max | 50 max | 50 max | 50 max |
| Diesel + Kerosene | | | | |
| Flow rate, t/h | 105.5 | 80.7 | 186.2 | 186.2 |
| Density @ 15° C., kg/m$^3$ | 839 | 822 | 830 | 830 |
| Sulphur content, ppm by weight | 10 max | 10 max | 10 max | 10 max |

TABLE 5-continued

Property of the finished products

| | Units simulated separately according to the prior art | | | According to the invention Common Diesel Hydrotreatment and Fractionation Hydrocracking |
|---|---|---|---|---|
| | Dedicated Fractionation Hydrotreatment | Dedicated Fractionation Hydrocracking | Properties of the mixture of the products of Hydrocracking and Diesel Hydrotreatment | |
| Calculated cetane number (ASTM D4737) | 52 | 59 | 56 | 56 |
| Viscosity @ 40° C., cSt | 2.6 | 2.6 | 2.6 | 2.6 |
| Flash point, ° C. | 55 | 57 | 58 | 62 |
| Distillation ASTM D86 | | | | |
| Recovered @ 250° C., vol % | 38 | 36 | 38 | 39 |
| Recovered @ 350° C., vol % | 94 | 93 | 96 | 96 |
| 95 vol % Recovered, ° C. | 353 | 355 | 348 | 346 |
| Unconverted VGO | | | | |
| Flow rate, t/h | — | 0.5 | 0.5 | 0.5 |
| Density @ 15° C., kg/m$^3$ | — | 844 | 844 | 844 |
| Sulphur content, ppm by weight | — | 10 max | 10 max | 10 max |
| Nitrogen content, ppm by weight | — | 5 max | 5 max | 5 max |
| Pour point | — | 40 max | 40 max | 40 max |
| Viscosity @ 100° C., cSt | — | 5.8 | 5.8 | 5.9 |
| Metals (Ni + V), ppm by weight | — | 0.1 max | 0.1 max | 0.1 max |
| ASTM D1160 Distillation, vol % | — | | | |
| IBP, ° C. | — | 384 | 384 | 392 |
| 10%, ° C. | — | 417 | 417 | 419 |
| 30%, ° C. | — | 445 | 445 | 445 |
| 50%, ° C. | — | 470 | 470 | 470 |
| 70%, ° C. | — | 500 | 500 | 500 |
| 90%, ° C. | — | 535 | 535 | 535 |
| FBP, ° C. | — | 564 | 564 | 564 |

Table 5 shows that the finished products obtained in the process according to the invention with a common fractionation section are equivalent in quantity and quality to the finished products obtained by mixing the products of the two simulated units according to the prior art each with their fractionation section with regard to the Diesel and Kerosene mixture and for the unconverted VGO.

Example 3 (According to the Invention

The Diesel hydrotreatment unit described in Example 1 with the feedstock described in Example 1 produces a Diesel+Kerosene cut that satisfies the properties of the Diesel pool grade A to D. With the same feedstock, this unit cannot produce a diesel conforming to the winter specifications for gasoil in standard EN590:2013 of July 2013, for temperate climates. Indeed, according to this standard, the maximum cold filter plugging point varies from +5° C. for Grade A to −15° C. for Grade E and −20 for Grade F, which corresponds to the grades typically used when the outside temperature is lower (in winter).

TABLE 6

Gasoil specifications in standard EN 590:2013 of July 2013:

| | General specifications |
|---|---|
| Density @ 15° C., kg/m$^3$ | 820-845 |
| Sulphur content, ppm by weight | 10 max |
| Calculated cetane number | 46 min |

TABLE 6-continued

Gasoil specifications in standard EN 590:2013 of July 2013:

| | General specifications |
|---|---|
| Viscosity @ 40° C., cSt | 2.5-4 |
| Flash point, ° C. | 55 min |
| Distillation ASTM D86 | |
| Recovered @ 250° C., vol % | 65 max |
| Recovered @ 350° C., vol % | 85 min |
| 95 vol % Recovered, ° C. | 360 max |

TABLE 7

Specifications of the cold temperature plugging point of the gasoil for temperate climates according to standard EN 590: 2013 of July 2013:

| Grade | A | B | C | D | E | F |
|---|---|---|---|---|---|---|
| Maximum cold filter plugging point (CFPP), ° C. | +5 | 0 | −5 | −10 | −15 | −20 |

According to the invention, the diesel hydrotreatment unit and the hydrocracking unit are implemented as in Example 2 with a common fractionation section where the different liquid and gaseous flows originating from the drums are supplied separately to the suitable points in the fractionation section. The same diesel feedstock sent to the diesel hydrotreatment unit makes it possible to produce various qualities of diesel+kerosene including that conforming to grade E by adjusting the cut point of the diesel in the common fractionation section.

The properties of the diesel+kerosene cut obtained according to the invention with two cut points different to the main fractionation are summarized in Table 7 below.

TABLE 8 properties of Diesel + Kerosene

|  | Cut point 1 | Cut point 2 |
|---|---|---|
| Flow rate, t/h | 186.2 | 173.9 |
| Density @ 15° C., kg/m³ | 830 | 829 |
| Sulphur content, ppm by weight | 10 max | 10 max |
| Calculated cetane number | 56 | 52 |
| Viscosity @ 40° C., cSt | 2.6 | 2.5 |
| Flash point, ° C. | 62 | 60 |
| Cold filter plugging point (CFPP), ° C. | −10 | −18 |
| Distillation ASTM D86 | | |
| Recovered @ 250° C., vol % | 39 | 44 |
| Recovered @ 350° C., vol % | 96 | 96 |
| 95 vol % Recovered, ° C. | 346 | 340 |
| Corresponding grade: | D | E |

Example 4

Example 4 shows the embodiment described in FIG. 4 with a common fractionation section comprising an atmospheric fractionation column C-2 without a column for the separation of light fractions C-1.

The process implemented in the example involves:
a hydrocracking unit of the same capacity and which treats the same feedstocks as the hydrocracking unit in Example 1 with the same objective and with the same operating conditions for the reaction section.
a diesel hydrotreatment unit of the same capacity and treating the same feedstocks as the diesel hydrotreatment unit in Example 1 with the same objective and with the same operating conditions for the reaction section.

The hydrocracking and diesel hydrotreatment units are first implemented independently of each other.

The layout of the hydrocracking unit is as follows: reaction section in two steps, then separation section, then fractionation section, constituted by an acid fractionation column C-2 without a column for the separation of the light fractions C-1.

The atmospheric fractionation column is supplied with the heavy fraction originating from the reaction section constituted by the liquid from the hot HP separator drum B-4, by the light fraction originating from the reaction section originating from the liquid from the hot LP separator drum B-5 and from the vapour phase from the hot LP separator drum B-5.

The fractionation column C-2 is constituted by a main column and two side strippers, one C-4 for the kerosene cut (150° C.-193° C.) and the other C-5 for the gasoil cut (193° C.-371° C.).

The products from the fractionation column are an unconverted oil (UCO), gasoil and kerosene which are mixed with the diesel pool and non-stabilized naphtha that will be treated in a downstream section and an acid gas fraction.

The layout of the diesel hydrotreatment unit is identical to the layout of the diesel hydrotreatment unit in Example 1.

The operating conditions of the separation section of each of the two units are identical to the operating conditions of the separation section of the units in Example 1:

The two units are then implemented, according to the invention, with a common fractionation section where the different liquid and gaseous flows originating from the separator drums are supplied to suitable places in the main fractionation column, without a column for separation of the light fractions, according to the embodiment described in FIG. 4, but with two side-strippers: a side-stripper C-4 on the kerosene cut and a side-stripper C-5 (not shown) on the diesel cut the products of which are mixed before going to diesel storage.

According to the invention, the fractionation column C-2 is supplied:
with the light phase originating from the reaction section of the hydrocracking section, originating from the mixture of liquid from the cold MP separator drum B-4 with the vapour phase from the hot LP separator drum B-5
with the light fraction originating from the reaction section of the hydrotreatment section, constituted by the liquid from the cold MP separator drum B-40,
with the heavy fraction originating from the reaction section from the hydrocracking section, constituted by the liquid from the hot LP separator drum B-5,
and with the heavy fraction originating from the reaction section of the hydrotreatment section, constituted by the liquid from the hot MP separator drum B-30.

The operating conditions of the columns are summarized in Table 9.

TABLE 9

Operating conditions of the fractionation sections:

| Operating parameters | | Hydrocracking Fractionation Section | Diesel Hydrotreatment fractionation Section | Common Diesel Hydrotreatment + Hydrocracking Fractionation Section |
|---|---|---|---|---|
| Stripping column | | | | |
| Top temperature | ° C. | — | 180 | — |
| Reflux temperature | ° C. | — | 222 | — |
| Bottom temperature | ° C. | — | 270 | — |
| Top pressure | MPa | — | 1.36 | — |
| Number of actual trays | | — | 30 | — |
| Light fraction from the HCK | | — | — | — |

TABLE 9-continued

Operating conditions of the fractionation sections:

| Operating parameters | | Hydrocracking Fractionation Section | Diesel Hydrotreatment fractionation Section | Common Diesel Hydrotreatment + Hydrocracking Fractionation Section |
|---|---|---|---|---|
| Light fraction from the HDT | | — | Tray 6 | — |
| Heavy fraction from the HDT | | — | — | — |
| Main Fractionation Column | | | | |
| Top temperature | ° C. | 115 | — | 109 |
| Reflux temperature | ° C. | 45 | — | 45 |
| Bottom temperature | ° C. | 352 | — | 354 |
| Top pressure | MPa | 0.19 | — | 0.19 |
| Number of actual trays | | 86 | — | 86 |
| Kerosene Draw-off | | Tray 27 | — | Tray 30 |
| Gasoil draw-off | | Tray 42 | — | Tray 45 |
| Light fraction from the Diesel Hydrotreatment | | — | — | Tray 35 |
| Heavy fraction from the Diesel Hydrotreatment | | — | — | Tray 40 |
| Cold light fraction from the Hydrocracking | | Tray 40 | — | Tray 40 |
| Hot light Fraction from the Hydrocracking | | Tray 50 | — | Tray 50 |
| Heavy fraction from the Hydrocracking | | Tray 66 | — | Tray 66 |

The properties of the finished products are compared according to the different fractionation layouts.

TABLE 10

Property of the finished products

| | Units simulated separated according to the prior art | | | According to the invention |
|---|---|---|---|---|
| | Dedicated Hydrotreatment fractionation | Dedicated Hydrocracking Fractionation | Properties of the mixture of the products of Hydrocracking and Diesel Hydrotreatment | Common Diesel Hydrotreatment and Hydrocracking Fractionation |
| Non-stabilized Naphtha | | | | |
| Flow rate, t/h | 0.8 | 10.9 | 11.7 | 9.9 |
| Density @ 15° C., kg/m$^3$ | 749 | 720 | 722 | 719 |
| Molecular Weight, kg/mol | 92.32 | 97.05 | 65.96 | 97.16 |
| Final boiling point, T ° C. | 214 | 144 | 183 | 144 |
| Sulphur content, ppm by weight | 50 max | 50 max | 50 max | 50 max |
| Diesel + Kerosene | | | | |
| Flow rate, t/h | 105.5 | 80.7 | 186.2 | 186.2 |
| Density @ 15° C., kg/m$^3$ | 839 | 822 | 830 | 830 |
| Sulphur content, ppm by weight | 10 max | 10 max | 10 max | 10 max |
| Calculated cetane number (ASTM D4737) | 52 | 59 | 56 | 56 |
| Viscosity @ 40° C., cSt | 2.6 | 2.6 | 2.6 | 2.6 |
| Flash point, ° C. | 55 | 57 | 58 | 62 |
| Distillation ASTM D86 | | | | |
| Recovered @ 250° C., vol % | 38 | 36 | 38 | 39 |

TABLE 10-continued

Property of the finished products

| | Units simulated separated according to the prior art | | | According to the invention |
|---|---|---|---|---|
| | Dedicated Hydrotreatment fractionation | Dedicated Hydrocracking Fractionation | Properties of the mixture of the products of Hydrocracking and Diesel Hydrotreatment | Common Diesel Hydrotreatment and Hydrocracking Fractionation |
| Recovered @ 350° C., vol % | 94 | 93 | 96 | 96 |
| 95 vol % Recovered, ° C. | 353 | 355 | 348 | 346 |
| Unconverted VGO | | | | |
| Flow rate, t/h | — | 0.5 | 0.5 | 0.5 |
| Density @ 15° C., kg/m³ | — | 844 | 844 | 844 |
| Sulphur content, ppm by weight | — | 10 max | 10 max | 10 max |
| Nitrogen content, ppm by weight | — | 5 max | 5 max | 5 max |
| Pour point | — | 40 max | 40 max | 40 max |
| Viscosity @ 100° C., cSt | — | 5.8 | 5.8 | 5.9 |
| Metals (Ni + V), ppm by weight ASTM D1160 Distillation, vol % | — | 0.1 max | 0.1 max | 0.1 max |
| IBP, ° C. | — | 384 | 384 | 390 |
| 10%, ° C. | — | 417 | 417 | 416 |
| 30%, ° C. | — | 445 | 445 | 446 |
| 50%, ° C. | — | 470 | 470 | 472 |
| 70%, ° C. | — | 500 | 500 | 500 |
| 90%, ° C. | — | 535 | 535 | 535 |
| FBP, ° C. | — | 564 | 564 | 564 |

Table 10 shows that the finished products obtained according to the invention with a common fractionation section constituted by a main fractionation column and two side stripping columns, are equivalent in quantity and quality to the finished products obtained by mixing the products of the two units implemented according to the prior art each with their fractionation section with regard to the Diesel and Kerosene mixture and for the unconverted VGO.

The invention claimed is:

1. An installation capable of hydrotreatment and hydroconversion of hydrocarbon-containing feedstocks, having a common fractionation section, and capable of production of at least one of the following products: naphtha (light and/or heavy), diesel, kerosene, distillate and residue, comprising at least:

at least one first unit comprising:
a first reaction section R-1 comprising at least one hydroconversion reactor;
a hot high-pressure separator drum (B-1) operating at a pressure of 1.4 to 35 MPa and a temperature of 200° to 450° C., and comprising a line supplied with effluent originating from the first reaction section (R-1), and liquid effluent which is a heavy fraction of effluent from the first reaction section (R-1);
a cold high-pressure separator drum (B-2), operating at a pressure of 1.3 to 35 MPa and a temperature of 20° C. to 100° C., and comprising a line supplied with gaseous flow originating from the hot high-pressure separator drum (B-1), and liquid effluent of which is a light fraction of effluent from the first reaction section R-1;
a hot medium-pressure separator drum (B-3), operating at a pressure of 1 to 5 MPa and a temperature of 200° C. to 450° C., and comprising a line supplied with liquid effluent originating from the hot high-pressure separator drum (B-1), and liquid effluent which supplies a drum (B-5);
a cold medium-pressure separator drum (B-4), operating at a pressure of 1 to 5 MPa and a temperature of 20° C. to 100° C., and comprising a line supplied with liquid effluent originating from the cold high-pressure separator drum (B-2), and gaseous fraction originating from the hot medium-pressure separator drum (B-3) and liquid effluent of which constitutes a feedstock of the common fractionation section;
a hot low-pressure separator drum (B-5), operating at a pressure of 0.2 to 2.5 MPa and a temperature of 200° C. to 450° C., and comprising a line supplied with liquid flow originating from the hot medium-pressure separator drum (B-3), and liquid effluent of which constitutes a feedstock of the common fractionation section;
a second unit comprising:
a second reaction section R-10 comprising at least one hydrotreatment reactor;
a hot high-pressure separator drum (B-10), operating at a pressure of 1.4 to 35 MPa and a temperature of 200° C. to 450° C., and comprising a line supplied with effluent originating from the second reaction section (R-10), and liquid effluent of which is a heavy fraction of effluent from the reaction section (R-10);

a cold high-pressure separator drum (B-20), operating at a pressure of 1.3 to 35 MPa and a temperature of 20° C. to 100° C., and comprising a line supplied with gaseous flow originating from the hot high-pressure separator drum (B-10), or directly with effluent originating from the second reaction section (R-10), and liquid effluent which constitutes a light fraction or a mixture of light fraction and heavy fraction from effluent from the second reaction section (R-10) which supplies either a cold medium- or low-pressure separator drum or supplies directly the common fractionation section;

a hot medium-pressure separator drum (B-30), operating at a pressure of 1 to 5 MPa and a temperature of 20° C. to 100° C., having a feedstock which liquid flow originating from the hot high-pressure separator drum B-10, a cold medium-pressure separator drum (B-40), operating at a pressure of 1 to 5 MPa and a temperature of 20° C. to 100° C., and comprising a line supplied with liquid flow originating from the cold high-pressure separator drum (B-20), and a line supplied with gaseous flow originating from the hot medium-pressure separator drum (B-30), and with liquid effluent which constitutes a feedstock of the common fractionation section;

a hot low-pressure separator drum (B-50), operating at a pressure of 0.2 to 2.5 MPa and a temperature of 200° C. to 450° C., and comprising a line supplied with the liquid flow originating from the hot medium-pressure separator drum (B-30), producing liquid effluent and vapour effluent of which constitute one or more feedstocks of the common fractionation section the common fractionation section comprising:

at least one main fractionation column (C-2), making it possible to separate a top fraction, an intermediate fraction and a heavy fraction, said fractions comprising the different products of the first and second units, flow or flows originating from the first unit and flow or flows originating from the second unit being supplied to said common fractionation unit being separate;

a separation column (C-1), said separation column (C-1) being separately supplied with:

liquid flow originating from the cold high-pressure separator drum (B-2), and optionally gaseous flow originating from the hot low-pressure separator drum (B-5) of the first unit;

liquid flow from the cold high-pressure separator drum (B-20), and/or liquid flow from the cold medium-pressure separator drum (B-40), and/or gaseous flow originating from the cold low-pressure separator drum (B-50), of the second unit;

the main fractionation column (C-2) being supplied with liquid effluent from said separation column (C-1), separately with liquid flow originating from the hot medium-pressure separator drum (B-30) of the second unit.

2. The installation according to claim 1 in which the common fractionation section also comprises:

at least one side-stripping column (C-4), (C-5) or (C-6), supplied with a product of the intermediate fraction originating from the main fractionation column (C-2), making it possible to separate a top gaseous fraction and a bottom liquid fraction, a pipe making it possible to send said top gaseous fraction to the main fractionation column (C-2);

an exchanger (E4) cooling said bottom liquid fraction of said side-stripping column;

an outlet pipe for cooled bottom liquid fraction.

3. The installation according to claim 2, comprising a section C-7 allowing treatment of acid gases, said section (C-7) comprising an amine absorber or a washing column, supplied with at least a part of a top fraction originating from the main fractionation column (C-2) containing residual acid gases.

4. The installation according to claim 1 comprising a section for recovery of liquefied petroleum gases comprising one or more fractionation columns, supplied with at least a part of a top fraction originating from the main fractionation column (C-2) containing residual acid gases, or with a flow originating from the section for the treatment of the acid gases (C7).

5. The installation according to claim 1, in which one of the reaction sections (R1) or (R10) comprises a hydroisomerization section including a catalytic dewaxing unit, comprising at least one catalytic bed of catalyst comprising a zeolite, a hydrogenating/dehydrogenating function, and an acid function.

6. The installation according to claim 1, in which the first unit is a hydrocracking unit and the second unit a diesel hydrodesulphurization unit.

7. The installation according to claim 1, in which the first unit is a residue or distillate or deasphalted oil ebullating bed hydroconversion unit, and the second unit is a vacuum distillate, or diesel or kerosene hydrodesulfurization unit.

8. The installation according to claim 7, in which the first unit is a deasphalted oil ebullating bed hydroconversion unit, and the second unit is a vacuum distillate hydrodesulfurization unit.

* * * * *